United States Patent
Shimosato

(10) Patent No.: US 7,657,568 B2
(45) Date of Patent: Feb. 2, 2010

(54) IMAGE PICKUP APPARATUS AND CONTROL METHOD THEREFOR

(75) Inventor: Jiro Shimosato, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 11/676,712

(22) Filed: Feb. 20, 2007

(65) Prior Publication Data

US 2007/0195371 A1    Aug. 23, 2007

(30) Foreign Application Priority Data

Feb. 20, 2006    (JP) .............................. 2006-043169

(51) Int. Cl.
*G06K 15/00*    (2006.01)
(52) U.S. Cl. .................. 707/104.1; 358/1.15; 358/1.18; 348/211.3; 348/207.1; 348/231.3
(58) Field of Classification Search ...... 707/100–104.1; 358/1.15, 1.18; 348/211.2, 211.3, 207.1, 348/222, 231.3
See application file for complete search history.

(56) References Cited

U.S. PATENT DOCUMENTS

| | | | |
|---|---|---|---|
| 6,128,369 A * | 10/2000 | Bowker et al. ........... | 379/22.03 |
| 6,816,189 B2 * | 11/2004 | Nagaoka et al. .......... | 348/231.2 |
| 2003/0088557 A1 * | 5/2003 | Morino ........................... | 707/3 |
| 2004/0080653 A1 * | 4/2004 | Tanaka et al. .......... | 348/333.01 |
| 2004/0267793 A1 * | 12/2004 | Sato ........................... | 707/100 |
| 2005/0044084 A1 * | 2/2005 | Huang ........................ | 707/100 |
| 2006/0077265 A1 * | 4/2006 | Matsumoto et al. .... | 348/231.99 |

FOREIGN PATENT DOCUMENTS

JP    2001-054041    2/2001

* cited by examiner

*Primary Examiner*—Tim T. Vo
*Assistant Examiner*—Shiow-Jy Fan
(74) *Attorney, Agent, or Firm*—Cowan, Liebowitz & Latman, P.C.

(57) ABSTRACT

This invention allows a user to easily classify and manage image files by recording an image file obtained by image capture and an image file obtained from an external apparatus in different folders. For this purpose, a system control unit which controls an overall digital camera determines whether the latest image data stored in a storage medium is image data captured in an image pickup mode or image data received in a communication mode. The system control unit then determines whether the current mode is the image pickup mode or the mode which allows reception. If the current mode coincides with neither of the two modes, since it indicates that the source of the image data to be saved in a storage medium differs from the source of the latest saved image data, the system control unit turns on a folder creation flag for the creation of a folder.

2 Claims, 18 Drawing Sheets

FIG. 12

AUTOMATIC FOLDER CREATION FLAG

MANUAL FOLDER CREATION FLAG

LATEST IMAGE SOURCE

FIG. 13

WHEN IMAGE SOURCE CHANGES

STORE FILE IN NEW FOLDER

STORE FILE IN EXISTING FOLDER

OPERATE ⇧⇩ AND PRESS ENTER KEY

IMAGE PICKUP APPARATUS AND CONTROL METHOD THEREFOR

INCORPORATION BY REFERENCE

This application claims the benefit of Japanese Patent Application No. 2006-043169, filed on Feb. 20, 2006, which is hereby incorporated by reference herein in its entirety.

BACKGROUND OF THE INVENTION

1. Field of the Invention

The present invention relates to an image pickup apparatus which captures and records still and moving images.

2. Description of the Related Art

Digital cameras and digital video cameras have been widely used, which capture still and moving images by using image sensing devices such as CCD sensors and CMOS sensors.

Such an apparatus records captured images as digital data files (captured image files) on a storage medium such as a compact flash memory card.

Many of these image processing apparatuses comprise interfaces for connection to external apparatuses, and can record images received from a connection partner as well as captured images as digital data files.

In general, such apparatuses record image files captured in this manner by using a file system (folder structure) using folders (directories). There is known a proposed technique of classifying captured image files by using folders and performing subsequent search operations (e.g., Japanese Patent Laid-Open No. 2001-54041).

The technique disclosed in Japanese Patent Laid-Open No. 2001-54041 is at best a technique associated with storage management of images captured by the user himself/herself. As described above, many currently available digital cameras can communicate with external apparatuses, and obviously can receive and store image data from external apparatuses (PCs, other digital cameras, and the like). When a digital camera stores images transferred from an external apparatus in this manner, the received images mix with the images captured by the user himself/herself in one storage medium. This makes it impossible for the user to determine which images are those received and which images are those captured by himself/herself.

SUMMARY OF THE INVENTION

The present invention has been made to solve the problems in such conventional techniques.

It is another object of the present invention to provide a technique of facilitating file management by storing an image captured by a user himself/herself and an image received from the outside in different folders.

In order to solve such problems, for example, an image pickup apparatus of the present invention has the following arrangement.

There is provided an image pickup apparatus including a communication unit which communicates with an external apparatus, comprising a mode selection unit which selects an image pickup mode using an image pickup unit or a communication mode using the communication unit, a storing and holding unit which stores and holds information for discriminating whether the latest image data stored in a storage medium is image data obtained in the image pickup mode or image data obtained in the communication mode, a determination unit which determines whether to create a new folder, by comparing a current mode selected by the mode selection unit with a mode in which the latest image data is stored in the storing and holding unit, and a file management unit which creates a new folder in the storage medium when image data to be stored in the storage medium is obtained in one of the modes and the determination unit determines to create a new folder, stores the image data as a file in the new folder, and when the determination unit determines not to create a new folder, stores the image data as a file in an existing folder in the storage medium.

According to the present invention, recording an image file recorded by image capture and an image file recorded by being received from an external apparatus in different folders allows the user to easily classify and manage image files.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a view showing the structure of a setting table held in a nonvolatile memory;

FIG. 13 is a view showing a GUI for settings for the creation of a folder in the embodiment;

DESCRIPTION OF THE EMBODIMENTS

The preferred embodiments of the present invention will be described in detail below with reference to the accompanying drawings.

Figure 1:
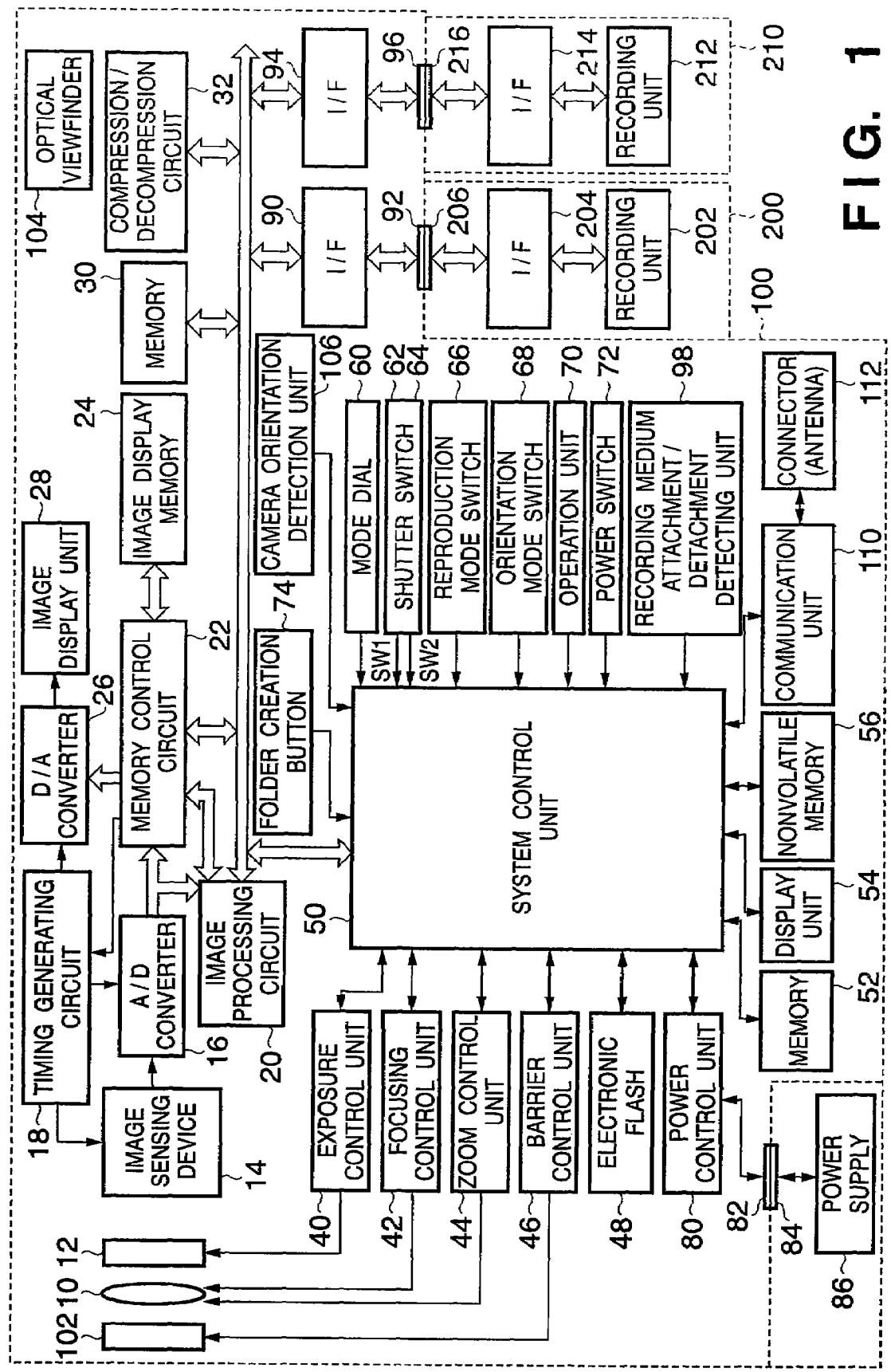
FIG. 1 is a block diagram showing the arrangement of a digital camera according to an embodiment.

FIG. 1 is a block diagram showing the arrangement of a digital camera as an example of an image processing apparatus according to the embodiment.

Referring to FIG. 1, reference numeral 10 denotes a photographing lens; 12, a shutter having a stop function; 14, an image sensing device such a CCD or a CMOS sensor which converts an optical image into an electrical signal; and 16, an A/D converter which converts an analog signal output from the image sensing device 14 into a digital signal.

A timing generating circuit 18 supplies clock signals and control signals to the image sensing device 14, the A/D converter 16, and a D/A converter 26. A memory control circuit 22 and a system control unit 50 control the timing generating circuit 18.

An image processing circuit 20 performs predetermined pixel interpolation processing and color conversion processing for data from the A/D converter 16 or data from the memory control circuit 22.

The image processing circuit 20 also performs predetermined arithmetic processing by using captured image data. The system control unit 50 controls an exposure control unit 40 and a focusing control unit 42 on the basis of the arithmetic processing result. That is, the digital camera performs AF (Auto Focus) processing, AE (Auto Exposure) processing, and EF (Electronic Flash pre-emission) processing of the TTL (Through The Lens) system.

In addition, the image processing circuit 20 performs predetermined arithmetic processing by using captured image data, and performs AWB (Auto White Balance) processing of the TTL system on the basis of the obtained arithmetic processing result.

The memory control circuit 22 controls the A/D converter 16, the timing generating circuit 18, the image processing circuit 20, an image display memory 24, the D/A converter 26, a memory 30, and a compression/decompression circuit 32.

Data from the A/D converter 16 is written in the image display memory 24 or the memory 30 through the image processing circuit 20 and the memory control circuit 22 or is directly written in the image display memory 24 or the memory 30 through the memory control circuit 22.

An image display unit 28 such as an LCD or an organic EL display displays through the D/A converter 26 the display image data written in the image display memory 24. Sequentially displaying captured image data (through-the-lens images) on the image display unit 28 makes it possible to implement an electronic viewfinder (EVF) function.

The image display unit 28 can arbitrarily turn on/off display in accordance with an instruction from the system control unit 50. Turning off display can greatly reduce the power consumption of a digital camera 100.

The memory 30 is a storage device which stores captured still and moving images, and has a storage capacity large enough to store a predetermined number of still images or a predetermined time period of moving images. For this reason, in the case of continuous shooting to continuously capture a plurality of still images, or in the case of panoramic image capture, it is possible to perform image writing into the memory 30 at high speed and in large volume.

Furthermore, it is possible to use the memory 30 as a work area of the system control unit 50.

The compression/decompression circuit 32 receives image data stored in the memory 30, performs known data compression processing or decompression processing by using adaptive discrete cosine transform (ADCT), wavelet transform, or the like, and writes the processed data in the memory 30.

The exposure control unit 40 controls the shutter 12 having the stop function and also has a flash dimming operation function in conjunction with an electronic flash 48.

The focusing control unit 42 controls focusing of the photographing lens 10. A zoom control unit 44 controls zooming of the photographing lens 10. A barrier control unit 46 controls the opening/closing operation of a lens barrier 102 as a lens barrier for protecting the photographing lens 10.

The electronic flash 48 functions as an auxiliary light source and also has a brightness control function. The electronic flash 48 also has an AF auxiliary light projection function.

The TTL system controls the exposure control unit 40 and the focusing control unit 42. The image processing circuit 20 arithmetically processes captured image data. The system control unit 50 receives the arithmetic processing result and controls the exposure control unit 40 and the focusing control unit 42.

The system control unit 50 is, for example, a CPU, and controls the overall digital camera (image pickup apparatus) 100 by executing the programs stored in a memory 52. The memory 52 stores constants, variables, programs, and the like for the operation of the system control unit 50.

A display unit 54 comprises a combination of output devices such as an LCD, an LED, and a speaker, and displays an operation state, a message, and the like using characters, images, sounds, and the like in accordance with the execution of a program by the system control unit 50. The digital camera 100 has one or a plurality of display units 54 arranged at easily observable positions near an operation unit 70. Part of the function of the display unit 54 is set in an optical viewfinder 104.

The display contents of the display unit 54 include a single shot/continuous shooting mode indication, a self-timer indication, a compression ratio indication, an indication of the number of recording pixels, an indication of the number of recorded images, an indication of the number of remaining images that can be captured, a shutter speed indication, an F-number indication, an exposure correction indication, an electronic flash indication, a red-eye reduction indication, a macro image capture indication, a buzzer setting indication, a remaining timepiece battery level indication, a remaining battery level indication, an error indication, an information indication by a number composed of a plurality of digits, an indication of the attachment/detachment state of recording media 200 and 210, an indication of the attachment/detachment state of a lens unit, a communication I/F operation indication, a date/time indication, an indication of the connection state to an external computer, an in-focus indication, an image capture preparation completion indication, a camera shake warning indication, an electronic flash charge indication, a recording medium write operation indication, and the like. Some of these indications are displayed in the optical viewfinder 104 as will be described later.

Among the display contents of the display unit 54, the display contents of the LED or the like include an in-focus indication, an image capture preparation completion indication, a camera shake warning indication, an electronic flash charge indication, an electronic flash charge completion indication, a recording medium write operation indication, a macro image capture setting notification indication, a secondary battery charged state indication, and the like.

Among the display contents of the display unit 54, the contents displayed by a lamp and the like include an indication by a self-timer notification lamp and the like. This self-timer notification lamp may be used together with AF auxiliary light.

A nonvolatile memory 56 is a memory that is electrically erasable and programmable, and an EEPROM or the like is used as the nonvolatile memory 56. The nonvolatile memory 56 is used to hold setting information (FIG. 12) to be described later as well as the name of the user and the like.

A mode dial 60, shutter switches 62 and 64, a reproduction mode switch 66, an orientation mode switch 68, and the operation unit 70 constitute an operation means for inputting various operation instructions to the system control unit 50. Each of these components comprises a button, a switch, a dial, a touch panel, a pointing device by line-of-sight detection, a voice recognition device, or the like or a combination thereof.

These operation means will be described concretely.

The mode dial 60 allows switching/setting of the following functional image capture modes: an automatic image capture mode, programmed image capture modes shutter speed priority image capture mode, stop priority image capture mode, manual image capture mode, focal depth priority (depth) image capture mode, vertical position image capture mode, horizontal position image capture mode, closeup image capture mode, sports image capture mode, nightscape image capture mode, and panoramic image capture mode.

The user turns on a shutter switch SW1 62 by pressing a shutter button (not shown), provided on the digital camera 100, midway (halfway). When the user turns on the first shutter switch SW1, the system control unit 50 gives the instruction for the start of processing, such as AF (Auto-Focus) processing, AE (Auto-Exposure) processing, AWB (Auto-White-Balance) processing, and EF (Electronic Flash pre-emission) processing.

Completely (fully) pressing the shutter button turns on a second shutter switch SW2 64. When the user turns on the second shutter switch SW2, the system control unit 50 gives the instruction to start a series of operations including the exposure processing of writing a signal read from the image sensing device 14, as image data, in the memory 30 through the A/D converter 16 and the memory control circuit 22, the development processing using arithmetic processing in the image processing circuit 20 and the memory control circuit 22, and the recording processing of reading out image data from the memory 30, compressing the data in the compression/decompression circuit 32, and writing the image data in the recording medium 200 or 210.

The reproduction mode switch 66 can set a reproduction mode, multi-screen reproduction/erase mode, PC connection mode, and the like.

The user uses the orientation mode switch 68 to turn on/off an orientation mode. The orientation mode is a mode of recording, on a recording medium, the orientation of the digital camera 100 detected by a camera orientation detection unit 106 at the time of image capture as auxiliary information (image orientation flag) in a captured image file, and using the recorded data at the time of reproduction. More specifically, this mode can perform control by referring to the image orientation flag at the time of reproduction such that an image captured in a vertical position is automatically displayed in a vertical position, and an image captured in a horizontal position is automatically displayed in a horizontal position.

The operation unit 70 comprises various buttons, a touch panel, and the like. More specifically, the buttons and switches of the operation unit 70 include a menu button, a set button, a macro button, a multi-screen reproduction/new page button, an electronic flash setting button, a single shot/continuous shooting/self-timer switching button, a menu movement+(plus) button, a menu movement−(minus) button, a reproduction image movement+(plus) button, a reproduction image movement−(minus) button, a captured image quality selection button, an exposure correction button, a date/time setting button, a selection/switching button for selecting and switching various functions, a determination/execution button for determining and executing various functions, an image display ON/OFF switch for turning on/off the image display unit 28, a quick review ON/OFF switch for setting a quick review function of automatically reproducing captured image data immediately after image capture, and a compression mode switch for selecting a compression ratio for JPEG (Joint Photographic Expert Group) compression or selecting a CCDRAW mode of recording a signal from the image sensing device on a recording medium upon converting it into a digital signal.

In this embodiment, as JPEG compression modes, for example, a normal mode and a fine mode are prepared. The user of the digital camera 100 can perform image capture by selecting the normal mode when importance is attached to the data size of a captured image, or by selecting the fine mode when importance is attached to the quality of a captured image.

In a JPEG compression mode, the compression/decompression circuit 32 reads out image data written in the memory 30, compresses the data at a set compression ratio, and records the data on, for example, the recording medium 200.

In a RAW mode, image data is read out from the memory 30, which is directly read from the image sensing device 14 for each line in accordance with the pixel array of the color filter of the image sensing device 14 through the A/D converter 16 and the memory control circuit 22, and is recorded on the recording medium 200.

A power switch 72 is a switch for turning on or off the power supply of this apparatus.

A new folder creation request button 74 is a button for creating a new folder in the recording medium 200 or 210 at the time of next image capture. When the user presses this button and is to store an image file in the recording medium 200 or 210, a new folder is created, and the file is stored in the created folder.

A power control unit 80 comprises a battery detection circuit, a DC/DC converter, a switch circuit which switches blocks to be energized, and the like. The power control unit 80 detects the attachment/detachment of a battery, the type of battery, and the remaining battery level, and controls the DC/DC converter on the basis of the detection result and an instruction from the system control unit 50, thereby applying a necessary voltage to each unit including a recording medium for a necessary period of time.

A power supply 86 comprises a primary battery, such as an alkaline battery or a lithium battery, a secondary battery such as an NiCd battery, an NiMH battery, or an Li battery, an AC adaptor, and the like. The power supply 86 is mounted in the digital camera 100 through connectors 82 and 86.

The recording media 200 and 210 such as a memory card and a hard disk respectively include recording units 202 and 212 comprising a semiconductor memory, a magnetic disk, and the like, interfaces 204 and 214 for the digital camera 100, and connectors 206 and 216. The recording media 200 and 210 are loaded in the digital camera 100 through the connectors 206 and 216 on the medium side and connectors 92 and 96 on the digital camera 100 side. Interfaces 90 and 94 connect to the connectors 92 and 96, respectively. A recording medium attachment/detachment detecting unit 98 detects the attachment/detachment of the recording media 200 and 210.

Although this embodiment has exemplified the digital camera 100 including two systems of interfaces and connectors for the attachment of recording media, the camera may comprise arbitrary numbers of interfaces and connectors as well as a single interface and a single connector. In addition, the embodiment may use interfaces and connectors with different specifications for the respective systems.

As interfaces and connectors, those complying with specifications such as the PCMCIA card specifications and the CF (CompactFlash (registered trademark)) card specifications can be used.

When this embodiment uses interfaces and connectors complying with the PCMCIA card specifications and the like as the interfaces 90 and 94 and the connectors 92 and 96, various types of communication cards can be connected. Such communication cards include a LAN card, a modem card, a USB card, an IEEE1394 card, a P1284 card, a SCSI card, and a communication card for PHS or the like. Connecting various types of communication cards makes it possible to exchange image data and management information attached to image data with other computers and peripheral devices such as printers.

The lens barrier 102 covers the image pickup unit including the lens 10 of the digital camera 100 to prevent the image pickup unit from being contaminated or damaged.

The optical viewfinder 104 is, for example, a TTL viewfinder, and forms a light beam passing through the lens 10 into an image by using a prism and a mirror. Using the optical viewfinder 104 makes it possible to perform image capture without using the electronic viewfinder function of the image display unit 28. As described above, information associated with some of the functions displayed on the display unit 54 are displayed in the optical viewfinder 104. For example, the information includes an in-focus indication, an image capture preparation completion indication, a camera shake warning indication, an electronic flash charge indication, an electronic flash charge completion indication, a shutter speed indication, an F-number indication, an exposure correction indication, a recording medium write operation indication, and the like.

The camera orientation detection unit 106 includes, for example, a switch which is turned on/off depending on the orientation of the camera, and detects the orientation state of the digital camera 100. The "orientation state" indicates a state from which it can be discriminated whether the camera is in the state of image capture in a horizontal position or image capture in a vertical position.

A communication unit 110 performs various types of communication processing such as RS232C, USB, IEEE1394, P1284, SCSI, modem, LAN, and wireless communication.

A connector (an antenna in a case of wireless communication) 112 connects the digital camera 100 to another device through the communication unit 110.

The contents of processing performed by the system control unit 50 in this embodiment will be described next.

The actual contents of the processing will be described after the description of an outline of a characteristic portion of this embodiment.

The digital camera according to this embodiment encodes image data obtained by the image sensing device 14, and stores the data as a file in the recording medium 200 or 210. In this case, the camera creates a folder in advance (which will be described in detail later) and stores the data in the folder. In addition, the digital camera according to the embodiment can also receive image data from an external apparatus (e.g., another digital camera) by wireless communication through the communication unit 110 and store the data as a file in any one of the folders in the recording media 200 and 210.

That is, there are two sources of image data stored in the recording media 200 and 210: an external apparatus and the digital camera of this embodiment. For the sake of descriptive simplicity, that an image data source is an external apparatus is expressed as that "an image data source is outside the camera", and that an image data source is a digital camera is expressed as that "an image data source is inside the apparatus".

In this embodiment, when one image data source switches to the other, the camera can automatically perform the process of creating a new folder and storing image data from the image data source into the created folder.

In addition, in this embodiment, when the user explicitly inputs an instruction to create a new folder and image data to be stored is generated, the camera can create a new folder and store the image data as a file in the folder.

FIG. 12 shows an example of the setting table held in the nonvolatile memory 56.

An automatic folder creation flag is determined by displaying a menu like that shown in FIG. 13 on the image display unit 28 and making the user operate with respect to the display. The automatic folder creation flag is turned on when the user selects "store in new folder" on the menu in FIG. 13. The automatic folder creation flag is turned off when the user selects "store in existing folder" on the menu in FIG. 13.

Referring to FIG. 12, the "manual folder creation flag" is determined depending on the new folder creation request button 74. When the user presses the new folder creation request button 74, the manual folder creation flag is turned on. When the user presses the new folder creation request button 74 again, the manual folder creation flag is turned off.

In addition, referring to FIG. 12, the field "latest image source" stores information indicating whether the image data source of the latest image data file stored in each of the recording media 200 and 210 is outside or inside the camera.

In this embodiment, when the manual folder creation flag is turned on and an image file is to be stored in the recording medium 200 or 210, the camera creates a new folder and determines it as a storage target in the subsequent processing regardless of whether the source of the image file is outside/inside the apparatus. For this reason, when the manual folder creation flag is ON and a folder is created, the camera turns off the manual folder creation flag (which operation will be described in detail later).

When the automatic folder creation flag is ON and the source of the latest image data file stored in the recording medium 200 or 210 differs from the source of image data to be stored this time, the camera creates a new folder and stores the newly created or received image data in the folder. The camera maintains this automatic folder creation flag unless the user makes a change on the menu in FIG. 13.

Note that if both the manual folder creation flag and the automatic folder creation flag are OFF, the camera stores the newly created image data in the folder in which the camera stored an image data file lastly.

Based on the above description, the contents of the processing performed by the system control unit 50 in this embodiment will be described with reference to the flowcharts of FIGS. 2 to 11. Although the flag termed "folder creation flag" will appear in the following description, it should be noted that this is a flag temporarily created in the RAM in the system control unit 50, and differs from the above manual folder creation flag and automatic folder creation flag.

Figure 9:
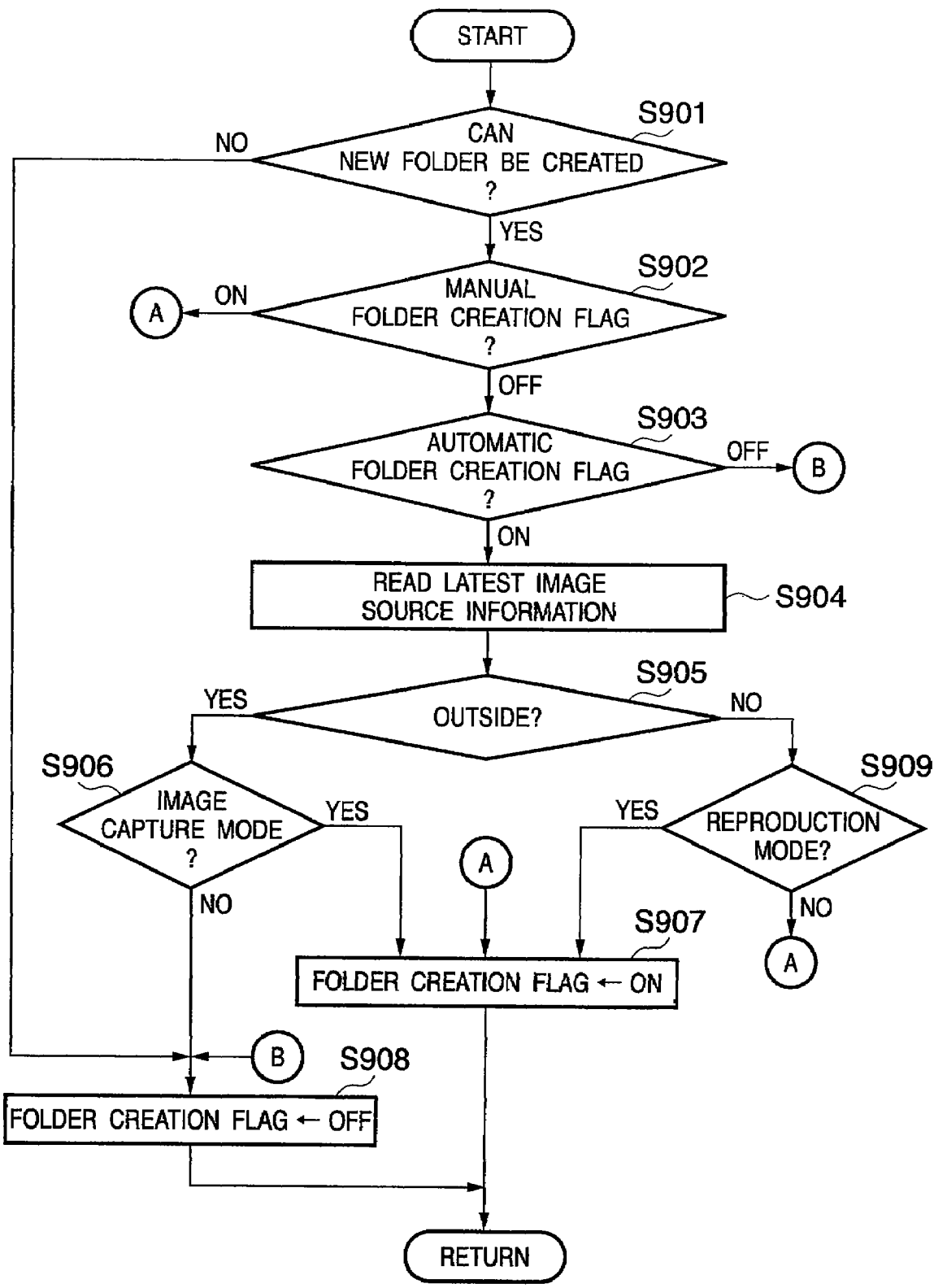
FIG. 9 is a flowchart showing the details of processing in step S140 in FIG. 3.

The process of creating a folder creation flag storing information indicating whether to create a folder, on the basis of the values of the manual folder creation flag and automatic folder creation flag will be described first with reference to the flowchart of FIG. 9. This processing is the same as that in step S140 in FIG. 3 and step S410 in FIG. 4, which will be described later.

First of all, the system control unit 50 determines in step S901 whether a folder can be created in the recording medium 200 (or 210). The system control unit 50 performs this determination on the basis of whether the recording medium 200 (or 210) is mounted in the digital camera of this embodiment.

If the system control unit 50 determines that a folder cannot be created, the process advances to step S908 to turn off the folder creation flag.

If the system control unit 50 determines that a folder can be created, the process advances to step S902 to determine whether the folder creation flag (see FIG. 12) is ON. If the system control unit 50 determines that the folder creation flag is ON, the process advances to step S907 to turn on the folder creation flag.

If the system control unit 50 determines in step S902 that the folder creation flag is OFF, the process advances to step S903. In step S903, the system control unit 50 determines whether the automatic folder creation flag (FIG. 12) is ON. If the system control unit 50 determines that the automatic folder creation flag is OFF, the process advances to step S908 to turn off the folder creation flag.

If the system control unit 50 determines that the automatic folder creation flag is ON, the process advances to step S904 to read in the latest image source information from the setting table (see FIG. 12) in the nonvolatile memory 56. In step S905, the system control unit 50 determines whether the source of the latest image data stored in the recording medium 200 (or 210) is data from the outside or the apparatus itself (inside). If the system control unit 50 determines that the latest image data stored in the recording medium 200 (or 210) is data received from the outside, the process advances to step S906.

In step S906, the system control unit 50 determines whether the current mode is the image capture mode. That is, the system control unit 50 determines whether the source of the latest image data stored in the recording medium 200 (or 210) differs from the source from which image data is assumed to be stored in a recording medium in accordance with the current mode. If the current mode is the image capture mode, the image data obtained when the user performs image capture by turning on the shutter switch SW2 will be stored in the newly created folder. The process therefore advances to step S907 to turn on the folder creation flag, and the system control unit 50 terminates this processing. If the system control unit 50 determines in step S906 that the current mode is the reproduction mode, since it indicates that the source of the image data to be stored in the recording medium 200 (or 210) is the same as the source of the image data stored lastly, the process advances to step S908 to turn off the folder creation flag. The system control unit 50 then terminates this processing.

If the system control unit 50 determines in step S905 that the source of the latest image data stored in the recording medium 200 (or 210) is inside the camera, the process advances to step S909. In step S909, the system control unit 50 determines whether the current mode is the reproduction mode. That is, the system control unit 50 determines whether the source of the latest image data stored in the recording medium 200 (or 210) differs from the source of image data assumed to be stored in the recording medium in accordance with the current mode. If the current mode is the reproduction mode, it is the image data received from an external data source that is stored in the recording medium 200 (or 210). The process advances to step S907 to turn on the folder creation flag. The system control unit 50 then terminates this processing. If the system control unit 50 determines in step S909 that the current mode is the image capture mode, it indicates that the source of the image data to be stored in the recording medium 200 (or 210) in this mode is the same as that of the image data stored lastly. The process then advances to step S908, and the system control unit 50 turns off the folder creation flag and terminates this processing.

To summarize the above processing, at least one of conditions A and B given below is satisfied to turn on the folder creation flag:

condition A: when the manual folder creation flag is ON; and condition B: when the manual folder creation flag is OFF, automatic folder creation flag is ON, and the source of the latest image data stored in the recording medium 200 (or 210) differs from the source of image data assumed to be stored in the recording medium 200 (or 210) in the current mode.

In contrast, if the above conditions are not satisfied, the folder creation flag is turned off.

Figure 2:
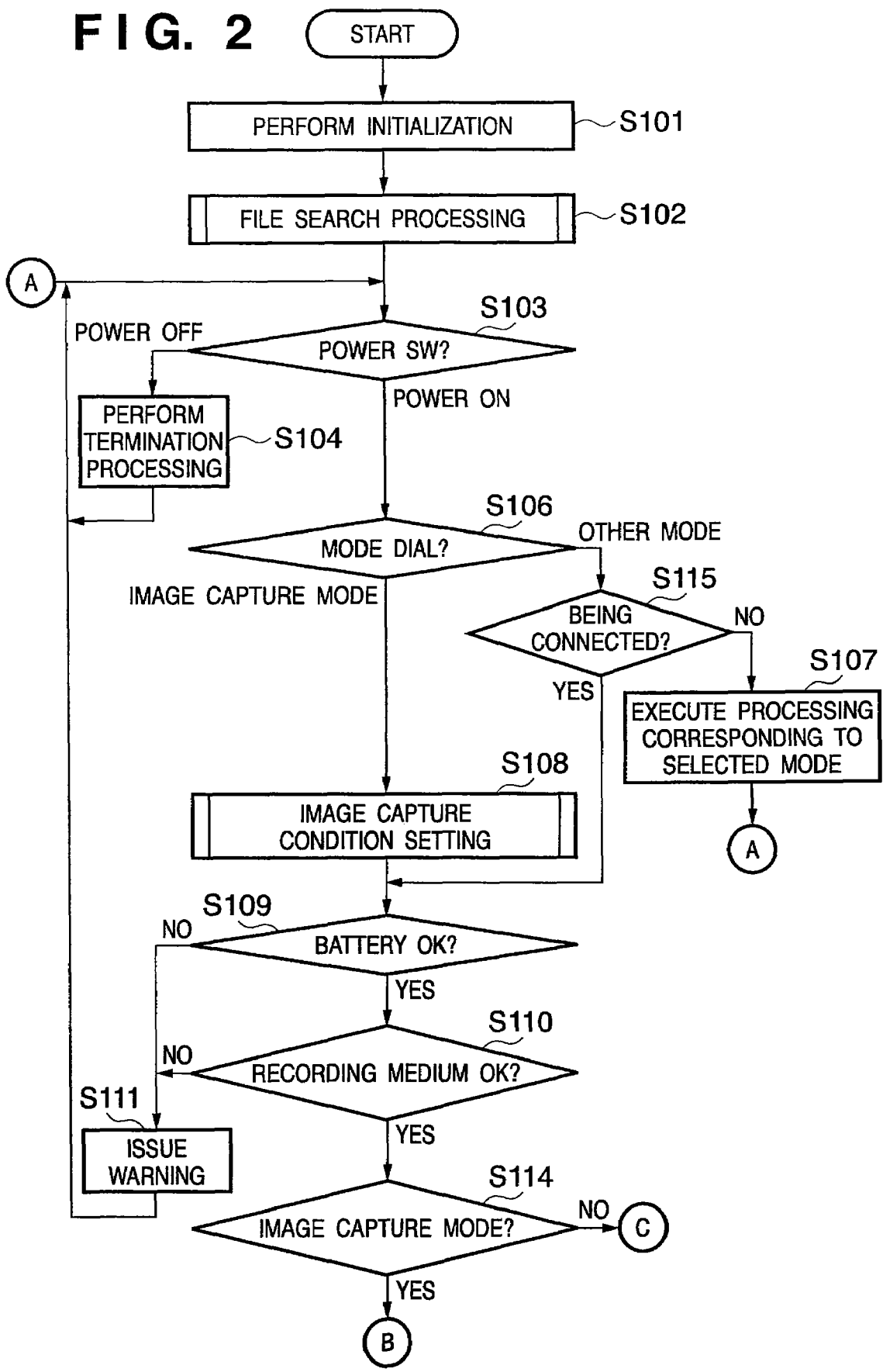
FIG. 2 is a flowchart showing the main processing executed by the system control unit of the digital camera according to the embodiment.

The main processing performed by the system control unit 50 according to this embodiment will be described below with reference to the flowcharts of FIGS. 2 to 4.

When the main power supply is turned on upon battery change, the system control unit 50 initializes the respective constituent elements (S101). The system control unit 50 then performs file search processing in the recording medium 200 or 210 (S102) The details of the file search processing in step S102 will be described later with reference to FIG. 8.

The system control unit 50 determines the set position of the power switch 72 (S103). If the power switch 72 is set OFF, the process advances to step S104 to perform predetermined termination processing. Termination processing includes the following processing: changing the display state of each display unit to the terminated state and protecting the image pickup unit by closing the lens barrier 102; recording the flags, the parameters including control variables and the like, the set values, and the set mode in the nonvolatile memory 56; causing the power control unit 80 to interrupt power to portions to which power need not be supplied, including the image display unit 28; and disconnecting the camera from an external apparatus if the camera has connected to it. When the system control unit 50 completes the termination processing, the process returns to step S103.

If the system control unit 50 determines in step S103 that the power switch 72 is set ON, the process advances to step S106 to detect the set position of the mode dial 60 and determine whether the current mode is the image capture mode. Upon determining that the current mode is the image capture mode, the system control unit 50 sets image capture conditions in step S108. The process then advances to step S109. The details of the image capture condition setting processing in step S108 will be described below with reference to FIG. 11.

Upon determining in step S106 that the mode dial 60 is set in a mode other than the image capture mode, the system control unit 50 determines in step S115 whether the communication unit 110 is currently communicating with an external apparatus. If the system control unit 50 determines that the communication unit 110 is currently communicating, the process advances to step S109. If the system control unit 50 determines that the communication unit 110 is not communicating with any external apparatus, the process advances to step S107 to execute processing corresponding the selected mode. When the system control unit 50 completes the processing, the process returns to step S103. One of the processes in step S107 is the process of displaying the GUI in FIG. 13 described above.

When the process advances to step S109, the system control unit 50 determines the remaining capacity or operation state of the power supply 86 comprising a battery and the like by using the power control unit 80. If the system control unit 50 determines that the state of the power supply 86 is a problem in terms of the operation of the digital camera 100, the system control unit 50 issues a predetermined warning corresponding to the problem with an image or sound using the display unit 54 in step S111. The process then returns to step S103.

If the system control unit 50 determines that there is no problem in the power supply 86, the process advances to step S110 to check the recording medium. That is, the system control unit 50 confirms the attachment/detachment of the recording medium 200 or 210, and determines whether there is sufficient free area, upon determining that the recording medium 200 or 210 is mounted. Upon determining that there is a problem in terms of recording/reproducing operation with respect to a recording medium, for example, neither the recording medium 200 nor the recording medium 210 is mounted, there is no free area, or normal read/write operation cannot be performed, the system control unit 50 issues a predetermined warning corresponding to the problem with an image or sound by using the display unit 54 in step S111. The process then returns to step S103.

If the system control unit 50 determines that there is no problem in the power supply and the recording medium, the process advances to step S114 to determine whether the current mode is the image capture mode or the camera connects to an external apparatus in another mode.

Figure 3:
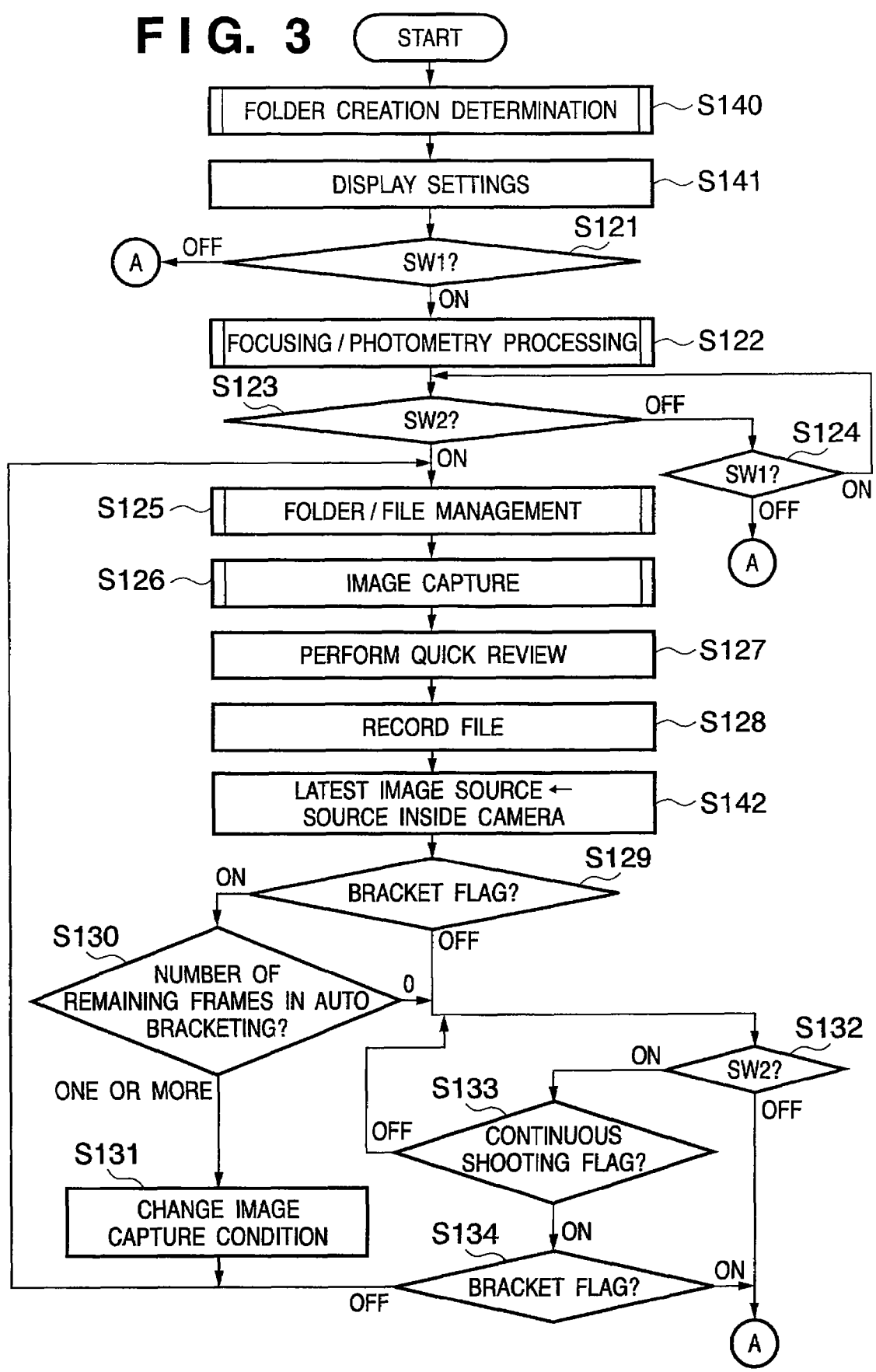
FIG. 3 is a flowchart showing the main processing executed by the system control unit of the digital camera according to the embodiment.

If the system control unit 50 determines that the current mode is the image capture mode, the process advances to step S140 (FIG. 3). The processing in step S140 is both the processing in FIG. 9 which has already been described and the process of determining the value of the folder creation flag.

The system control unit 50 advances to step S141 to display various kinds of set states on the display unit 54. Note that if the image display unit 28 is set ON, the system control unit 50 displays various kinds of set states of the digital camera 100 with images by using the image display unit 28 as well. The details of this setting display processing will be described later with reference to FIG. 5.

After setting display processing, the system control unit 50 detects the state of the shutter switch SW1 in step S121. If the shutter switch SW1 is not ON (the release button is not in the half pressed state), the process returns to step S103. Upon determining that the shutter switch SW1 is ON, the system control unit 50 advances the process to step S122.

In step S122, the system control unit 50 performs focusing processing (AF processing) to focus the photographing lens 10 on an object, and performs photometry processing (AE processing) to determine an F-number and a shutter speed. In this photometry processing, the system control unit 50 also performs electronic flash setting. This focusing/photometry processing will be described in detail later with reference to FIG. 6.

When the focusing/photometry processing is complete, the system control unit 50 checks the states of the shutter switches SW1 and SW2 (steps S123 and S124). If the shutter switch SW1 is turned off while the shutter switch SW2 is OFF, the process returns to step S103.

When the system control unit 50 detects that the shutter switch SW2 is turned on (the release button is fully pressed) while the shutter switch SW1 is ON, the process advances to step S125.

In step S125, the system control unit 50 determines a save file name for the preparation of image capture, and performs file/folder management processing, e.g., creation processing for a new folder, in accordance with the settings. The folder/file management processing in step S125 will be described in detail later with reference to FIG. 10.

In step S126, the system control unit 50 performs image capture processing. First of all, the system control unit 50 writes captured image data in the memory 30 through the image sensing device 14, A/D converter 16, image processing circuit 20, and memory control circuit 22, or directly writes the data in the memory 30 from the A/D converter through the memory control circuit 22 (exposure processing). The system control unit 50 reads out the image data written in the memory 30 by using the memory control circuit 22 and also using the image processing circuit 20 as needed, and executes image capture processing comprising the development processing of performing various processes. This image capture processing will be described in detail later with reference to FIG. 7.

Upon completing the image capture processing, the system control unit 50 performs quick review processing of displaying the captured image on the image display unit 28, and displays the captured image for the user to allow him/her to check the image in step S127.

If no deletion instruction is issued during a predetermined quick review period, the system control unit 50 performs recording processing in step S128. That is, the system control unit 50 reads out the captured image data written in the memory 30, and performs various kinds of image processing by using the memory control circuit 22 (also using the image processing circuit 20 as needed). The system control unit 50 then performs image compression processing corresponding to the set mode by using the compression/decompression circuit 32 to create a captured image file complying with a predetermined recording file format by adding additional information such as an orientation flag to the header or the like. The system control unit 50 then writes the captured image file at a predetermined recording destination in the recording medium 200 or 210 such as a memory card or CompactFlash (registered trademark) card through the interface 90 or 94 and the connector 92 or 96.

If the image display unit 28 is ON, the system control unit 50 displays an indication like "BUSY" indicating that write operation is being performed on the image display unit 28 while writing image data in the recording medium 200 or 210. In addition, the system control unit 50 displays a recording medium write operation indication such as blinking of the LED on the display unit 54.

Subsequently, the process advances to step S142 to store, in "latest image source" in the setting table (see FIG. 12), information indicating that the image data recorded in step S128 has been captured by the digital camera itself, i.e., the source of the latest image data is inside the camera.

The process advances to step S129, in which the system control unit 50 determines the state of a bracket flag stored in an internal memory or the memory 52 (step S129). The bracket flag is a flag representing the execution/non-execution of auto bracketing. If the bracket flag is released, the flow advances to step S132.

Upon determining that the bracket flag is set, the system control unit 50 determines in step S130 whether the number of remaining frames in auto bracketing is one or more. If the result is YES in step S130, since it indicates that auto bracketing is not complete, the system control unit 50 changes image capture conditions in auto bracketing in step S131. The flow then returns to step S125. When the process returns to step S125, the system control unit 50 creates no new folder, although this operation will be obvious from the following description. In addition, image capture conditions in auto bracketing include, for example, an exposure correction value and a white balance value.

When the process advances to step S132, the system control unit 50 detects the state of the shutter switch SW2. If the shutter switch SW2 is OFF, the process returns to step S103. If the shutter switch SW2 is ON, the process advances to step S133 to detect the state of a continuous shooting flag stored in the internal memory or the memory 52 in the system control unit 50. If the continuous shooting flag is set, the process advances to step S134.

In step S134, the system control unit 50 determines the state of the bracket flag as in step S129, and determines whether the bracket flag is released (OFF). If the system control unit 50 determines that the bracket flag is released, the process returns to step S125 to perform the next image capture. If the bracket flag is set, the process returns to step S103. This is because, in this embodiment, setting is performed such that if the bracket flag is ON, no continuous shooting is performed.

The above is the processing in the image capture mode. Processing to be performed when the system control unit 50 determines in step S114 in FIG. 2 that the camera is communicating with an external apparatus will be described with reference to the flowchart of FIG. 4.

First of all, the system control unit 50 determines in step S410 whether to create a new folder. The folder creation determination processing in step S410 is the same as that in step S140 in FIG. 3. That is, as already has been described with reference to FIG. 9, the system control unit 50 performs this processing to determine the value of the folder creation flag for determining whether to create a new folder.

The system control unit 50 then advances to step S412 to display various setting states on the display unit 54. If the image display unit 28 is set to ON, the system control unit 50 displays various setting states of the digital camera 100 with images by also using the image display unit 28. The details of this setting display processing are also the same as those of step S141 in FIG. 3 and will be described later with reference to FIG. 5.

In step S401, the system control unit 50 determines whether the camera is currently communicating with an external device through the communication unit 110 and the reception of image data from the external apparatus is detected. If the system control unit 50 determines that the reception of image data is not detected, the process returns to step S103. If the system control unit 50 determines that the reception of image data is detected, the process advances to step S402, in which the system control unit 50 determines whether it can currently receive the image data. In this case, states in which image data cannot be received include a state in which, for example, the system control unit 50 is accessing the recording medium 200 and no data can be written from another apparatus into the recording medium 200, a state in which there is no free area in the recording medium 200.

If the system control unit 50 determines in step S402 that the image data can be received, the process advances to step S403. In step S403, the system control unit 50 performs file/folder management, e.g., determining a save file name for the preparation of reception and creating a new folder in accordance with the settings. The processing in step S403 is the same as that in step S125 in FIG. 3, and the details thereof will be described later with reference to FIG. 12.

Subsequently, the system control unit 50 performs recording processing in step S404. That is, the system control unit 50 reads out the received image data written in the memory 30, and performs various kinds of image processing by using the memory control circuit 22 (also using the image processing circuit 20 as needed). The system control unit 50 then performs image compression processing corresponding to the set mode by using the compression/decompression circuit 32 to create a received image file complying with a predetermined recording file format by adding additional information such as an orientation flag to the header or the like. The system control unit 50 then writes the received image file to a predetermined recording destination in the recording medium 200 or 210 such as a memory card or CompactFlash (registered trademark) card through the interface 90 or 94 and the connector 92 or 96.

If the image display unit 28 is ON, the system control unit 50 displays an indication like "BUSY" indicating that write operation is being performed on the image display unit 28 while writing image data into the recording medium 200 or 210. In addition, the system control unit 50 displays a recording medium write operation indication such as blinking of the LED on the display unit 54.

Subsequently, in step S405, the system control unit 50 stores, in "latest image source" in the setting table in the nonvolatile memory 56, information indicating "outside" to indicate the source of the latest image data stored in the recording medium 200 is outside the camera. The process then returns to step S103.

Figure 4:
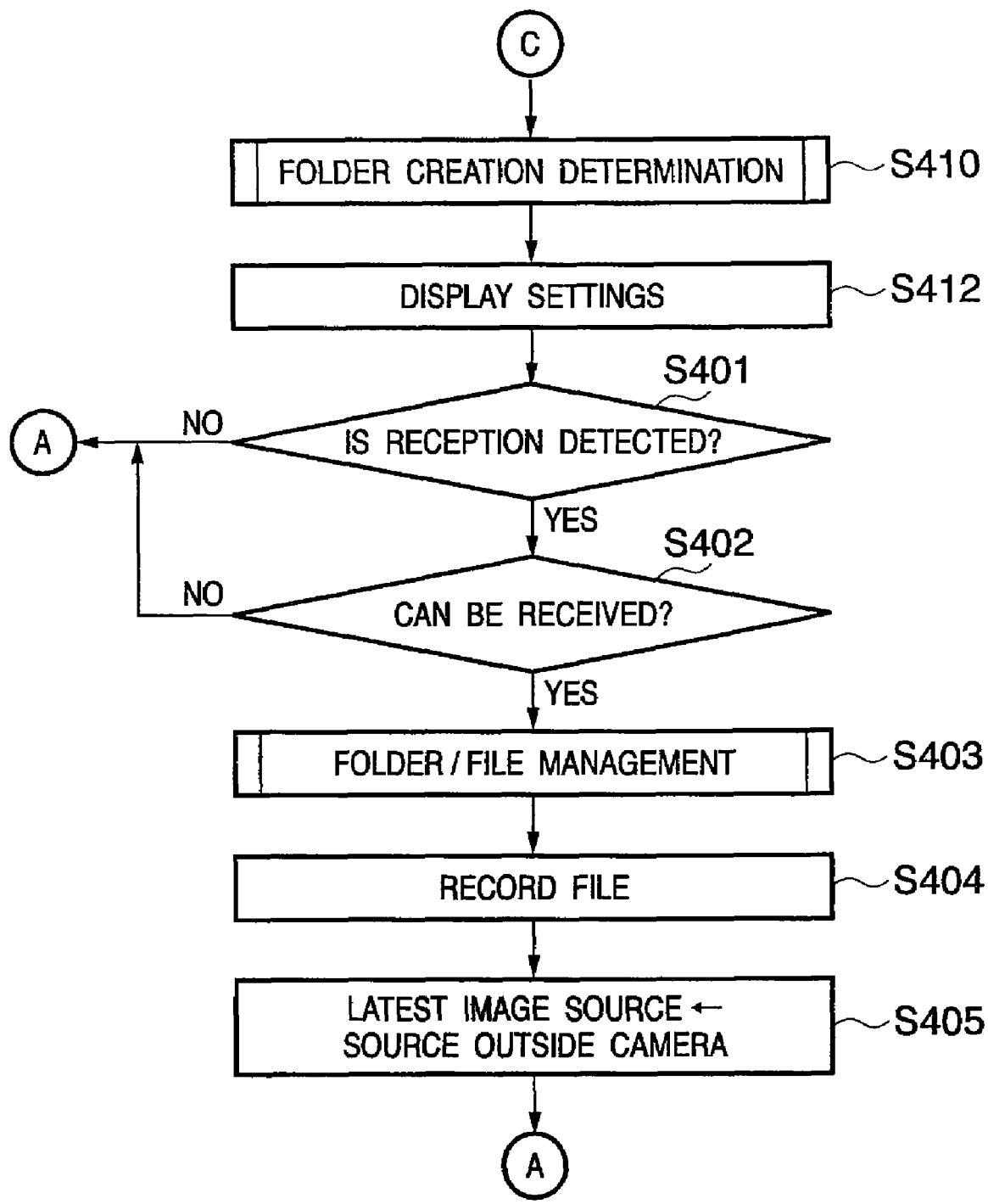
FIG. 4 is a flowchart showing the main processing executed by the system control unit of the digital camera according to the embodiment.
Figure 5:
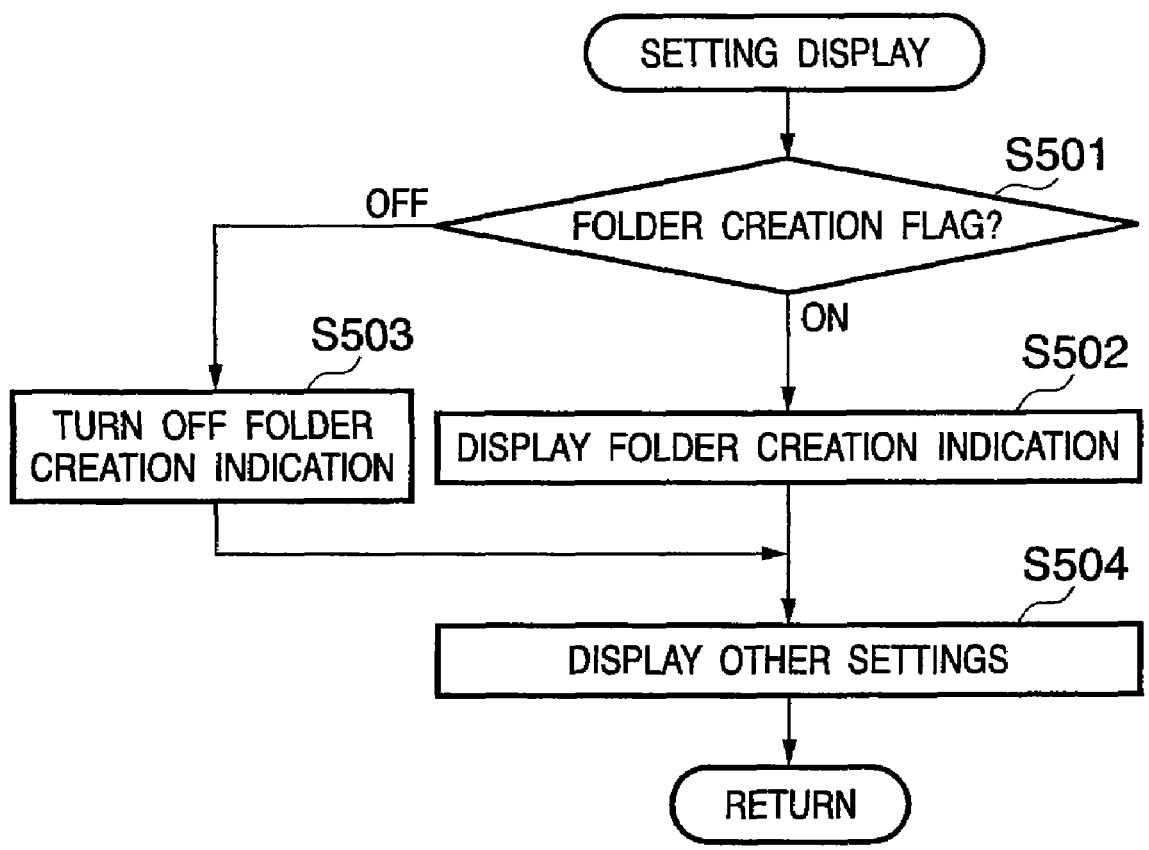
FIG. 5 is a flowchart showing the details of processing in step S141 in FIG. 3.

FIG. 5 is a flowchart showing the details of the setting display processing in step S141 in FIG. 3 and step S412 in FIG. 4.

First of all, the system control unit 50 determines the value of the folder creation flag which is determined in step S140 or S410. Upon determining that the folder creation flag is ON, the system control unit 50 gives a notification of the creation of a new folder in the next image capture using the display unit 54 with an image or sound (step S502). Note that if the image display unit 28 is ON, the system control unit 50 gives a notification of the creation of a folder using the image display unit 28 with an image or sound.

If the folder creation flag is OFF, the system control unit 50 stops giving the notification of the creation of a folder on the display unit 54 (including the image display unit 28) in step S503. Note, however, that as will be described later, if the display unit which has received the notification of the creation of the folder immediately updates the state, i.e., stops giving the notification of the creation of the folder, there is no need to execute step S503.

In step S504, the system control unit 50 notifies the various setting states of the digital camera 100, other than the folder creation flag, on the display unit 54 (and/or the image display unit 28) (or updates the notification contents), and terminates the processing.

Figure 14:
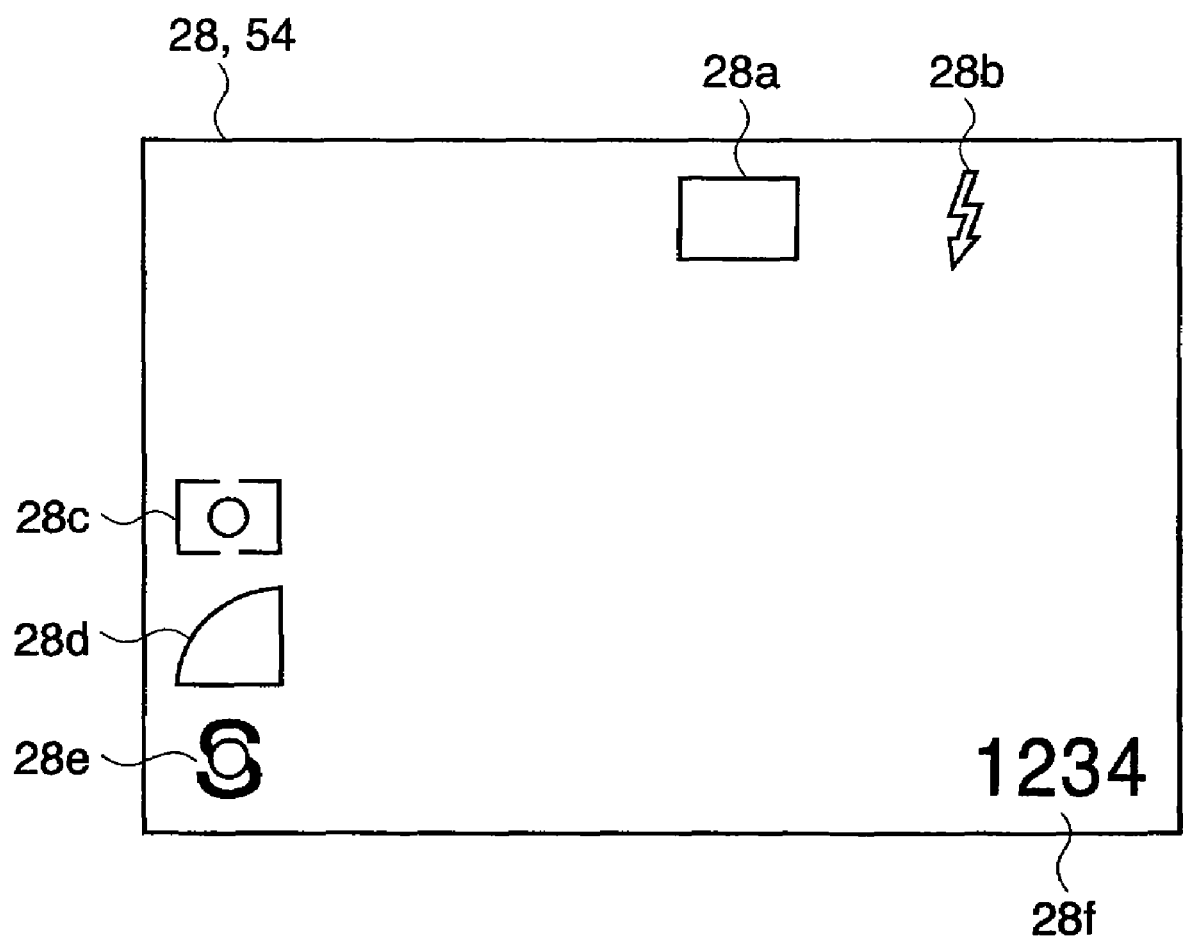
FIG. 14 is a view showing an example of display on a display unit in the embodiment.

FIG. 14 shows an example of display performed by the display unit 54 (and the image display unit 28) when the system control unit 50 performs the processing in steps S503 and S504. With the processing in step S504, the system control unit 50 displays a single shot/continuous shooting indication (28*a*), an electronic flash indication (28*b*), a photometry scheme indication (28*c*), a compression ratio indication (28*d*), an indication of the number of recording pixels (28*e*), and an indication of the number of remaining images that can be captured (28*f*).

Figure 15:
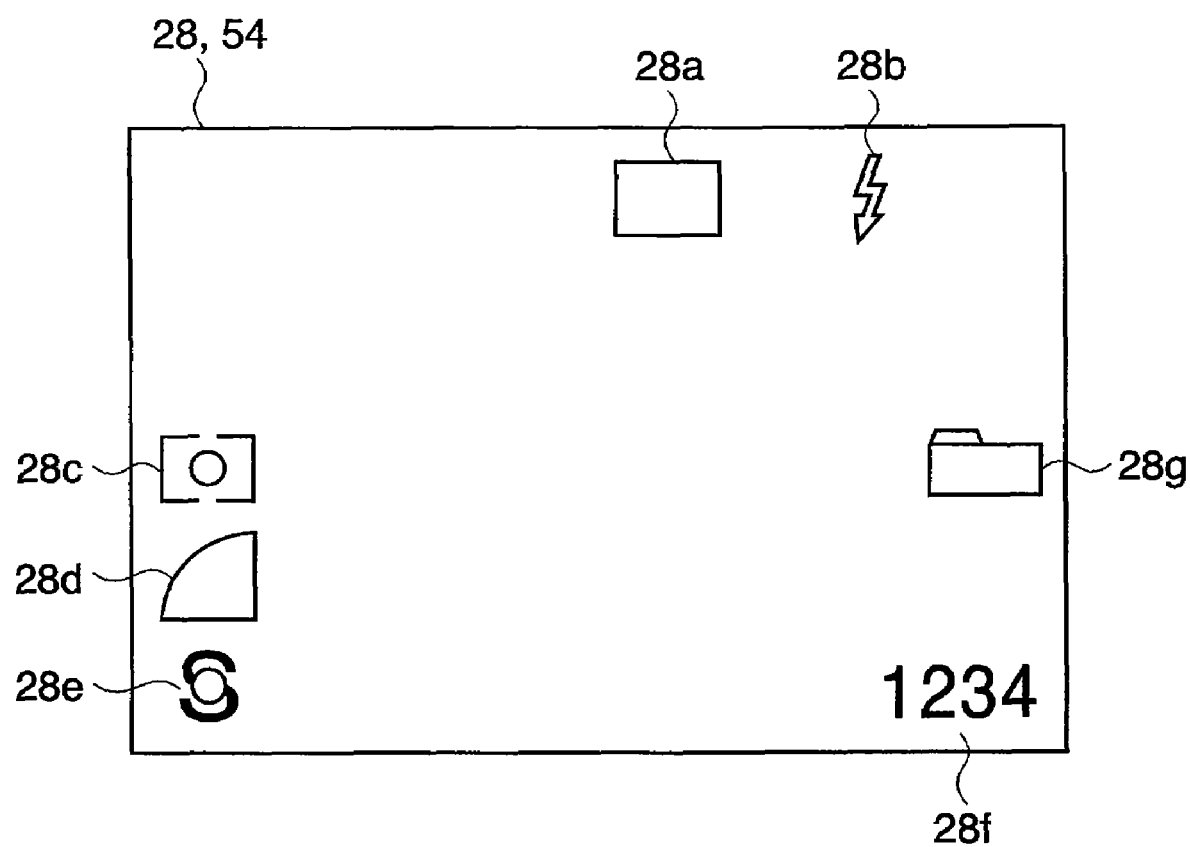
FIG. 15 is a view showing an example of display on the display unit in the embodiment.

FIG. 15 shows an example of display performed by the display unit 54 (and the image display unit 28) when the system control unit 50 performs the processing in steps S502 and S504. As in the case shown in FIG. 14, the system control unit 50 displays a single shot/continuous shooting indication (28a), an electronic flash indication (28b), a photometry scheme indication (28c), a compression ratio indication (28d), an indication of the number of recording pixels (28e), and an indication of the number of remaining images that can be captured (28f). In addition, with the processing in step S502, when saving the next image file, the system control unit 50 displays an icon 28g for displaying information indicating that a folder is to be created. During quick review processing in step S127, the system control unit 50 may or may not display a folder creation indication (e.g., an icon 28g in FIG. 15). Likewise, during quick review processing in step S127, the system control unit 50 may or may not display various setting indications (e.g., icons 28a to 28f in FIG. 15) of the digital camera 100 other than the folder creation indication.

Figure 16:
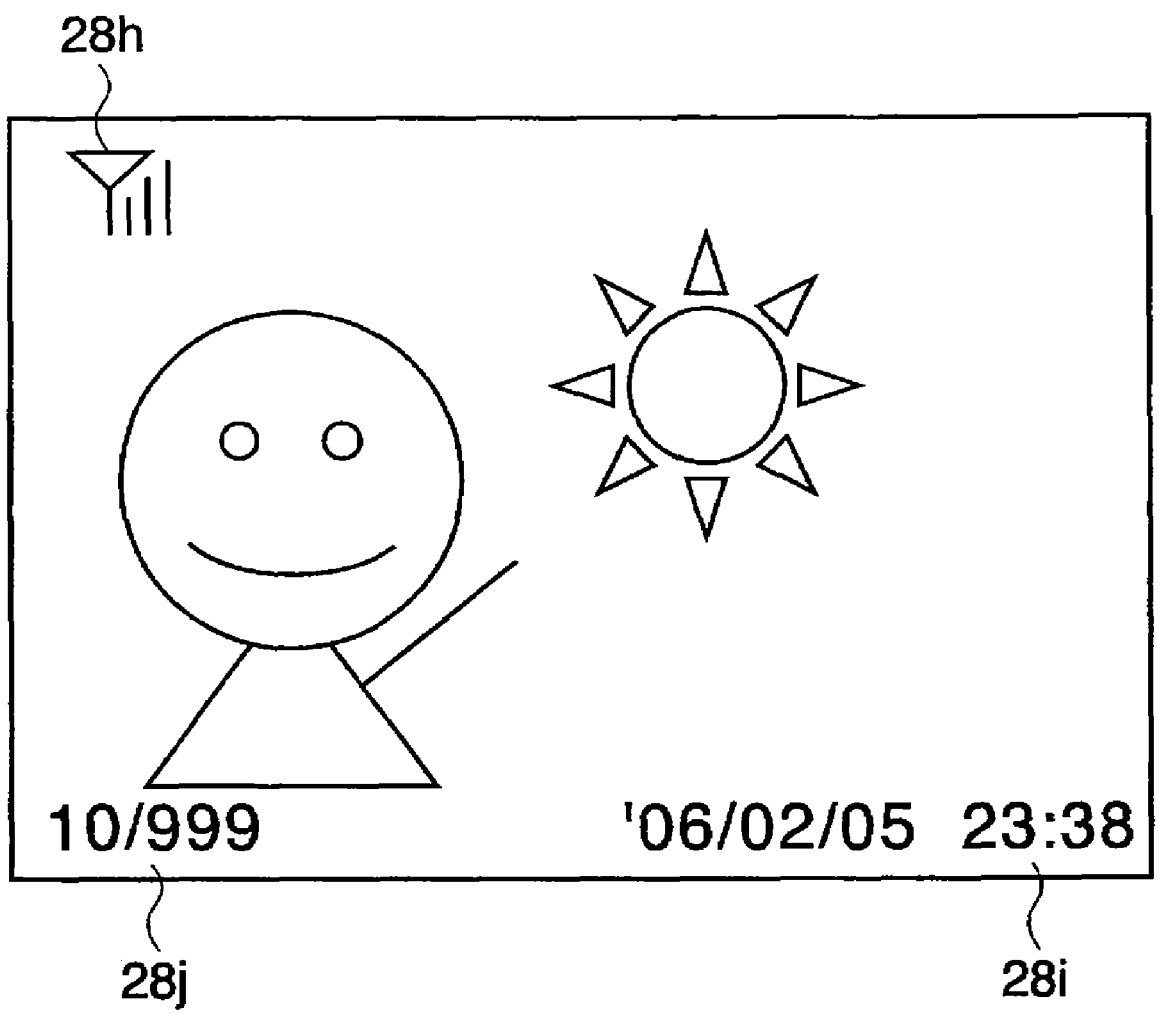
FIG. 16 is a view showing an example of display on the display unit in the embodiment.

FIG. 16 shows an example of display performed by the display unit 54 (and the image display unit 28) when the system control unit 50 performs the processing in step S503 and S504.

In this embodiment, a reproduction mode state is assumed as a receivable state, and hence during a reception wait state, the display unit 54 displays the same information as that in the reproduction mode.

That is, the display unit 54 displays information associated with a given image and connection information, e.g., a field intensity indication (28h), a currently displayed file number (28j), and the image capture date (28i) of the displayed file.

Figure 17:
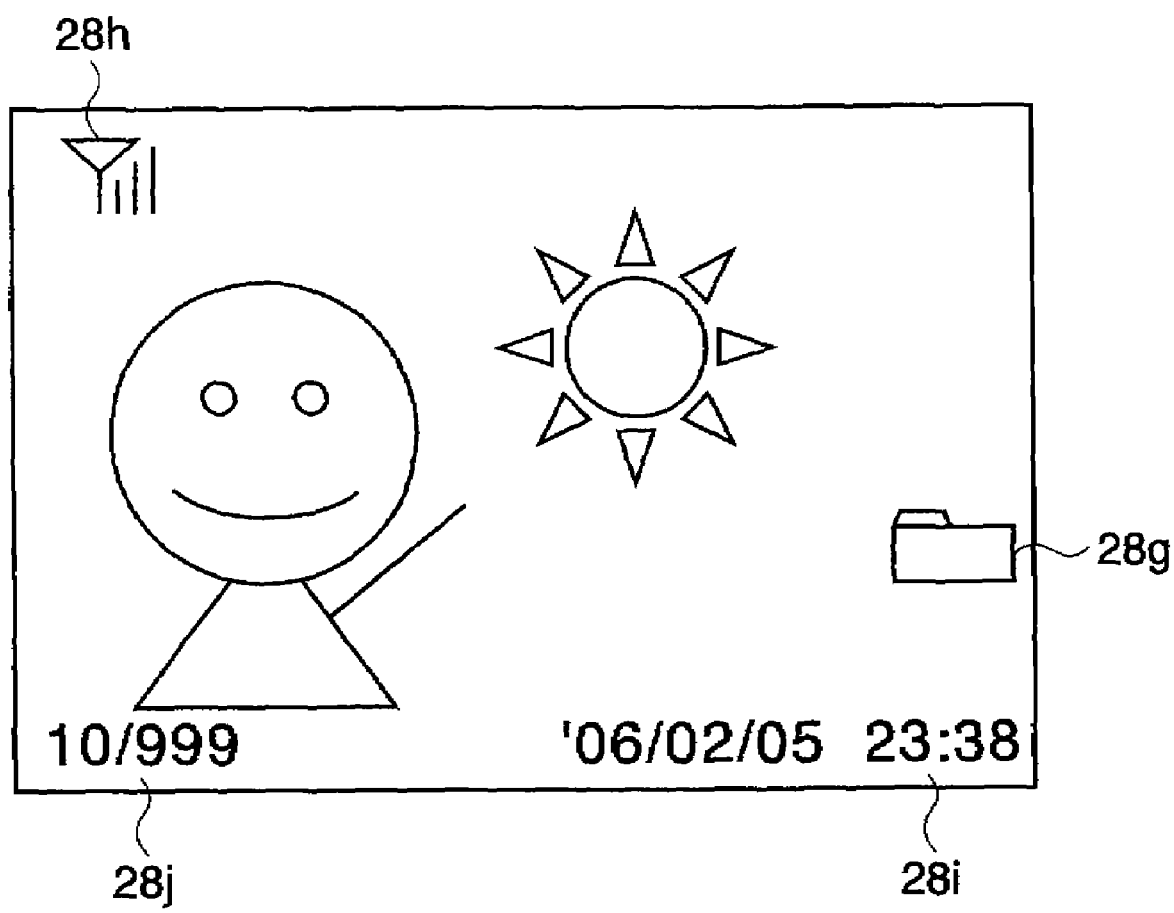
FIG. 17 is a view showing an example of display on the display unit in the embodiment.

FIG. 17 shows an example of display performed by the display unit 54 (and the image display unit 28) when the system control unit 50 performs the processing in steps S502 and S504. As in FIG. 16, the display unit 54 displays information associated with a given image and connection information, e.g., a field intensity indication (28h), a currently displayed file number (28j), and the image capture date (28i) of the displayed file. With the processing in step S502, the display unit 54 also displays the folder creation icon 28g.

Figure 6:
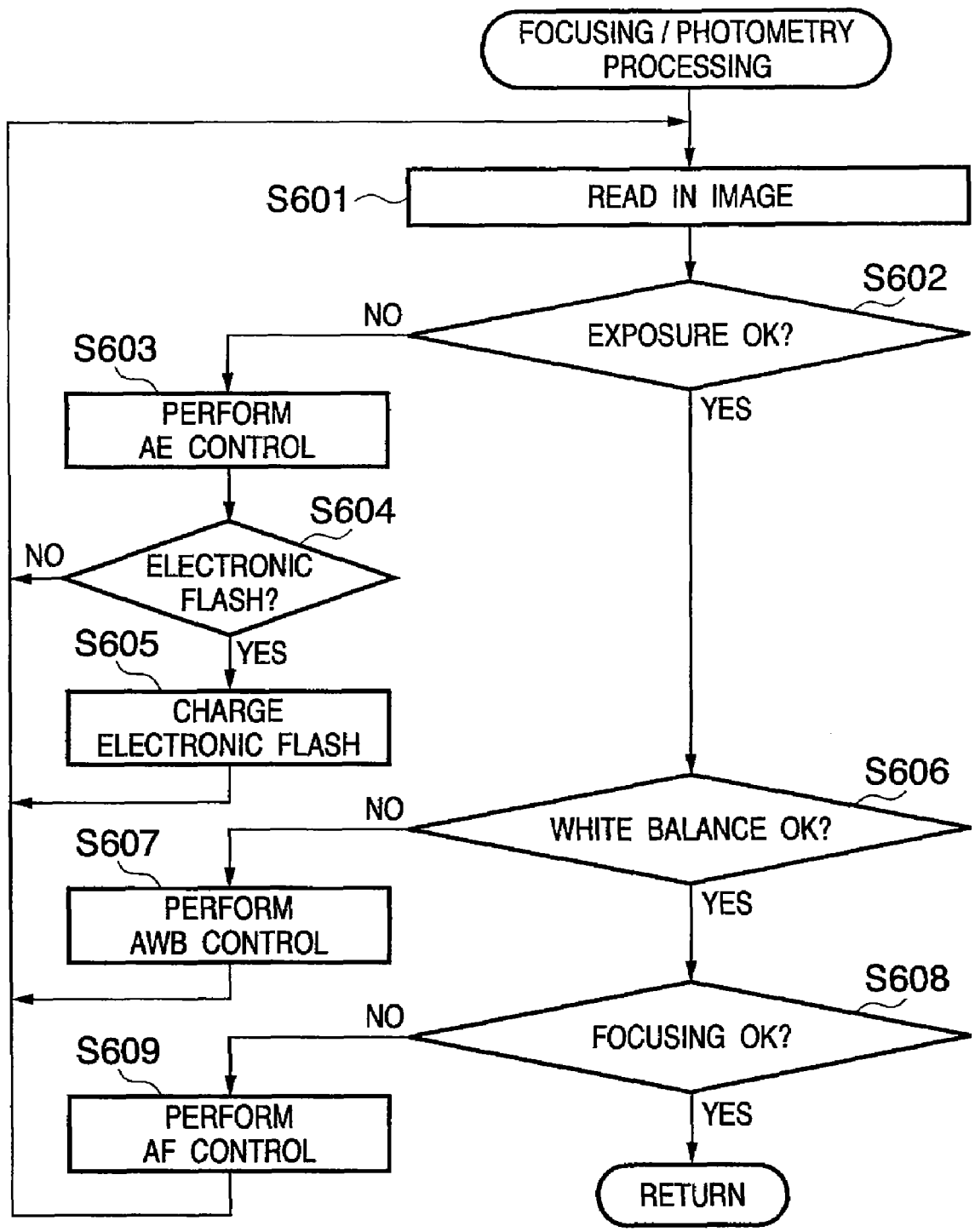
FIG. 6 is a flowchart showing the details of processing in step S122 in FIG. 3.

The details of the focusing/photometry processing in step S122 in FIG. 3 will be described next with reference to the flowchart of FIG. 6.

The system control unit 50 reads out a charge signal from the image sensing device 14, and sequentially writes captured image data in the image processing circuit 20 through the A/D converter 16 (step S601). The image processing circuit 20 performs predetermined arithmetic processing used for AE (Auto Exposure) processing, EF (Electronic Flash pre-emission) processing, and AF (Auto Focus) processing of the TTL (Through The Lens) system by using the sequentially read image data.

In each process in this case, of the total number of captured pixels, the image processing circuit 20 extracts a necessary number of pixels of a specific portion corresponding to necessity and uses them for arithmetic processing. This makes it possible to perform optimal arithmetic processing for each of the different modes, e.g., the centerweighted mode, average mode, and evaluation mode in each of the AE, EF, AWB, and AF processes of the TTL system.

The system control unit 50 performs AE control using the exposure control unit 40 in step S603 until determining in step S602 by using the arithmetic processing result obtained by the image processing circuit 20 that an automatic exposure value is proper. The system control unit 50 determines by using the measurement data obtained by AE control whether the electronic flash is necessary (S604). If the electronic flash is necessary, the system control unit 50 sets the electronic flash flag to charge the electronic flash 48 (S605).

Upon determining in step S602 that an automatic exposure value is proper, the system control unit 50 stores measurement data and/or setting parameters (photometry data) in automatic exposure control in the internal memory or the memory 52 in the system control unit 50.

When the AE control processing is complete, the system control unit 50 performs auto white balance processing by using the arithmetic processing result in the image processing circuit 20 and the measurement data obtained by AE control in steps S606 and S607. That is, the system control unit 50 adjusts color processing parameters by using the image processing circuit 20 in step S607 until determining in step S606 that an auto white balance value is proper.

Upon determining in step S606 that an auto white balance value is proper, the system control unit 50 stores measurement data or setting parameters in AWB control in the internal memory or the memory 52.

The system control unit 50 then performs AF control by using the measurement data obtained by AE control and AWB control in steps S608 and S609. That is, the system control unit 50 drives the AF lens and calculates the degree of focusing by using the focusing control unit 42 until determining in step S508 that an in-focus state is obtained.

Upon determining in step S608 that an in-focus state is obtained, the system control unit 50 stores measurement data and/or setting parameters in AF control in the internal memory and the memory 52, and terminates the focusing/photometry process.

Figure 7:
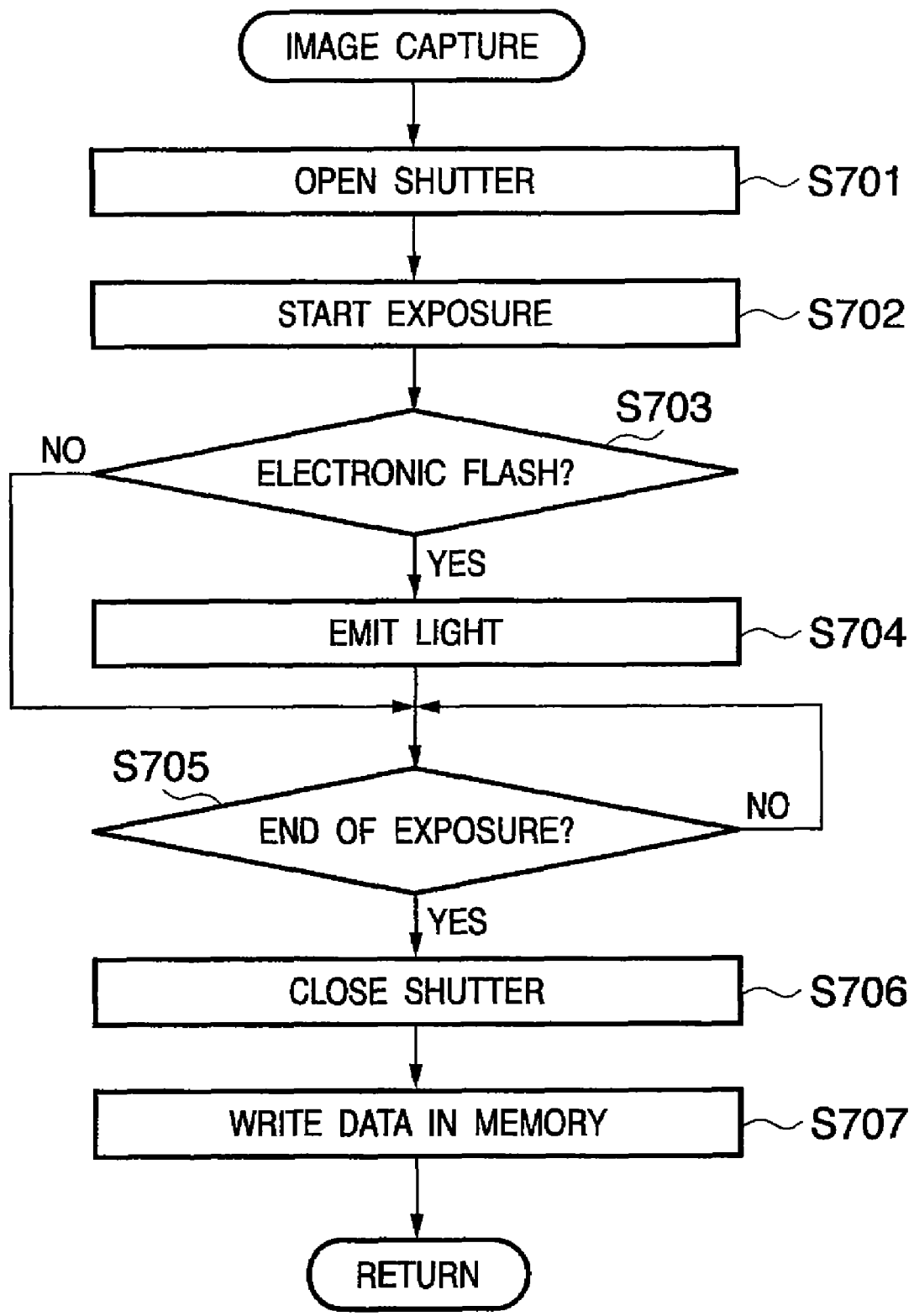
FIG. 7 is a flowchart showing the details of processing in step S126 in FIG. 3.

The details of the image capture processing in step S126 in FIG. 3 will be described with reference to the flowchart of FIG. 7.

The system control unit 50 causes the exposure control unit 40 to start exposure by the image sensing device 14 by opening the shutter 12 having the stop function in accordance with an F-number on the basis of the photometry data stored in the internal memory or the memory 52 (S701 and S702).

The system control unit 50 then determines in step S703 in accordance with the electronic flash flag whether it is necessary to emit light using the electronic flash 48. If the result is YES in step S703, the system control unit 50 causes the electronic flash 48 to emit light in step S704.

The system control unit 50 waits for the elapse of the exposure time of the image sensing device 14 in accordance with the photometry data (S705), and closes the shutter 12 (S706), thereby terminating the exposure. The system control unit 50 reads a charge signal from the image sensing device 14, and writes the captured image data in the memory 30 through the A/D converter 16, image processing circuit 20, and memory control circuit 22, or writes the data from the A/D converter 16 into the memory 30 through the memory control circuit 22 (step S707). If the captured image data write in the memory 30 is complete, the system control unit 50 terminates the image capture processing.

The file search processing in step S102 in FIG. 2 will be described next with reference to the flowchart of FIG. 8.

First of all, the system control unit 50 determines in step S801 whether search processing is complete up to the latest image. Upon determining that the search processing is not complete, the system control unit 50 reads out the root directory entry from the recording medium 200 or 210 (step S802).

The system control unit 50 then analyzes the root directory entry read out in step S802 to determine the presence/absence of a "/DCIM" folder (directory) (step S803). If the "/DCIM"

folder does not exist, the system control unit 50 determines that there is no reproduction image, and terminates the processing.

Upon determining that the "/DCIM" folder exists in the root directory entry, the system control unit 50 reads in the directory entry of the "/DCIM" folder. The system control unit 50 then sets a search folder number (DirNum) to 999 which is the maximum number in the DCF specifications (Design rule for Camera File system), and sets a variable (FileNum) representing the number of files to 0 (step S805).

The system control unit 50 checks whether there is a corresponding folder (step S806). More specifically, the system control unit 50 checks whether a [/DCIM/(DirNum) XXXXX] folder (directory) exists in the recording medium. In this case, (DirNum) in a folder name is the value of the variable DirNum, i.e., a DCF directory number (999 to 100), and X is an arbitrary ASCII one-byte alphanumeric character. For example, if the value of the variable DirNum is "100", and XXXXX is "ABCDE", [/DCIM/(DirNum)XXXXX] represents [/DCIM/100ABCDE].

Upon determining in step S806 that there is a folder having a name in the form of "number of 100 to 999+five one-byte alphanumeric characters", the system control unit 50 reads out the content (directory entry) (S807). The system control unit 50 then determines whether there is any reproducible file (S808). The system control unit 50 performs this determination by checking the presence/absence of a file having a predetermined extension (e.g., .jpg).

Upon determining in step S808 that that there is no reproducible file, the system control unit 50 determines whether DirNum has reached the minimum value (=100). If the value of DirNum>100, the system control unit 50 decrements the current value by one (S811). The flow then returns to step S806 to search for a next folder. If the system control unit 50 determines in step S810 that the value of DirNum is 100, the process advances to step S813.

Upon determining in step S808 that there are reproducible files, the system control unit 50 determines one of the reproducible files which has the largest DCF file number as the latest image (step S809). A DCF file number is a number in the range of "10001 to 9999" forming the lower four characters of a DCF file name (eight characters) In step S812, the system control unit 50 sets the DCF file number of the latest image to the variable FileNum. In step S813, the system control unit 50 stores the value of the variable FileNum as latest-image-related information in the internal memory or the memory 52. The process then advances to step S814.

If the system control unit 50 determines in step S801 that a latest image has already been confirmed, the process advances to step S813 to store the values of DirNum and FileNum which have already been determined as latest-image-related information in the internal memory or the memory 52. The system control unit 50 terminates this processing.

The system control unit 50 determines in step S801 that a latest image has been confirmed, when, for example, the nonvolatile memory 56 or the like stores/holds the DCF directory number (DirNum) and DCF file number (FileNum) of the latest image determined in the previous file search processing.

The latest-image-related information stored in the internal memory or the memory 52 in the system control unit 50 in step S813 includes the DCF directory number (DirNum) of the folder in which the above latest image exists and the DCF file number (FileNum) of the latest image. In this embodiment, in addition to these pieces of information, the system control unit 50 records the total number of reproducible files existing in the folder (directory), the image capture date and time, the time stamp of the latest image, and the like as latest-image-related information.

The above description has been made on the assumption that the system control unit 50 holds the DCF file number of the latest image in the nonvolatile memory 56 or the like, and stores latest-image-related information in the internal memory or the memory 52. However, in addition to the DCF file number of a latest image, the system control unit 50 may hold other pieces of latest-image-related information in the nonvolatile memory 56 or the like.

When capturing a new image, the system control unit 50 confirms a save destination folder and a file name by using a DCF directory number and DCF file number following the DCF directory number and DCF file number of the latest image searched out in this processing.

Figure 8:
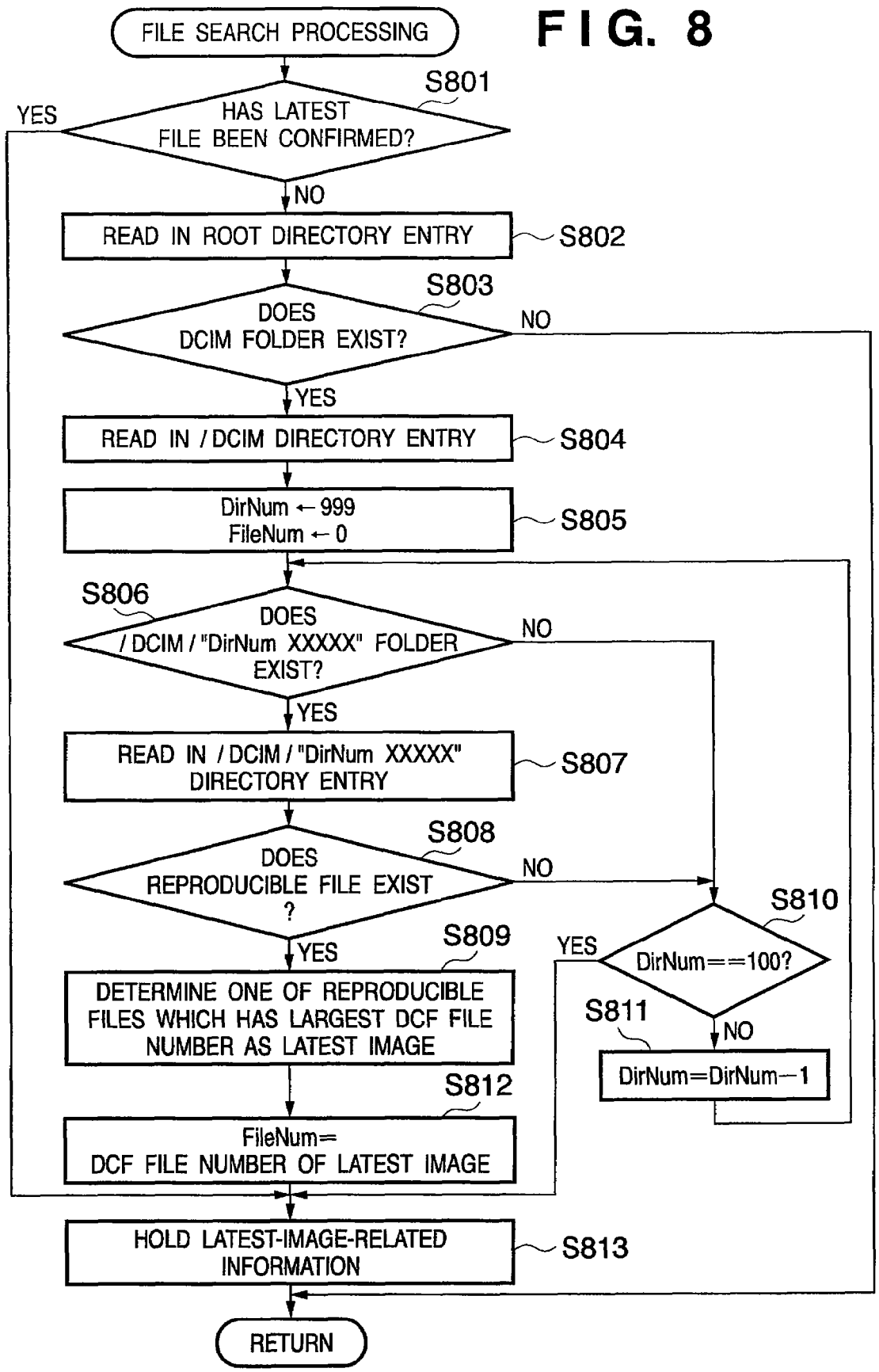
FIG. 8 is a flowchart showing the details of processing in step S102 in FIG. 2.

According to the flowchart of FIG. 8, the system control unit 50 searches for a file having the largest DCF file number as the latest image. However, this is merely an example. For example, the system control unit 50 may search for the latest image in a specific DCF directory in the DCF specifications or an image file recorded last in the recording medium.

Figure 10:
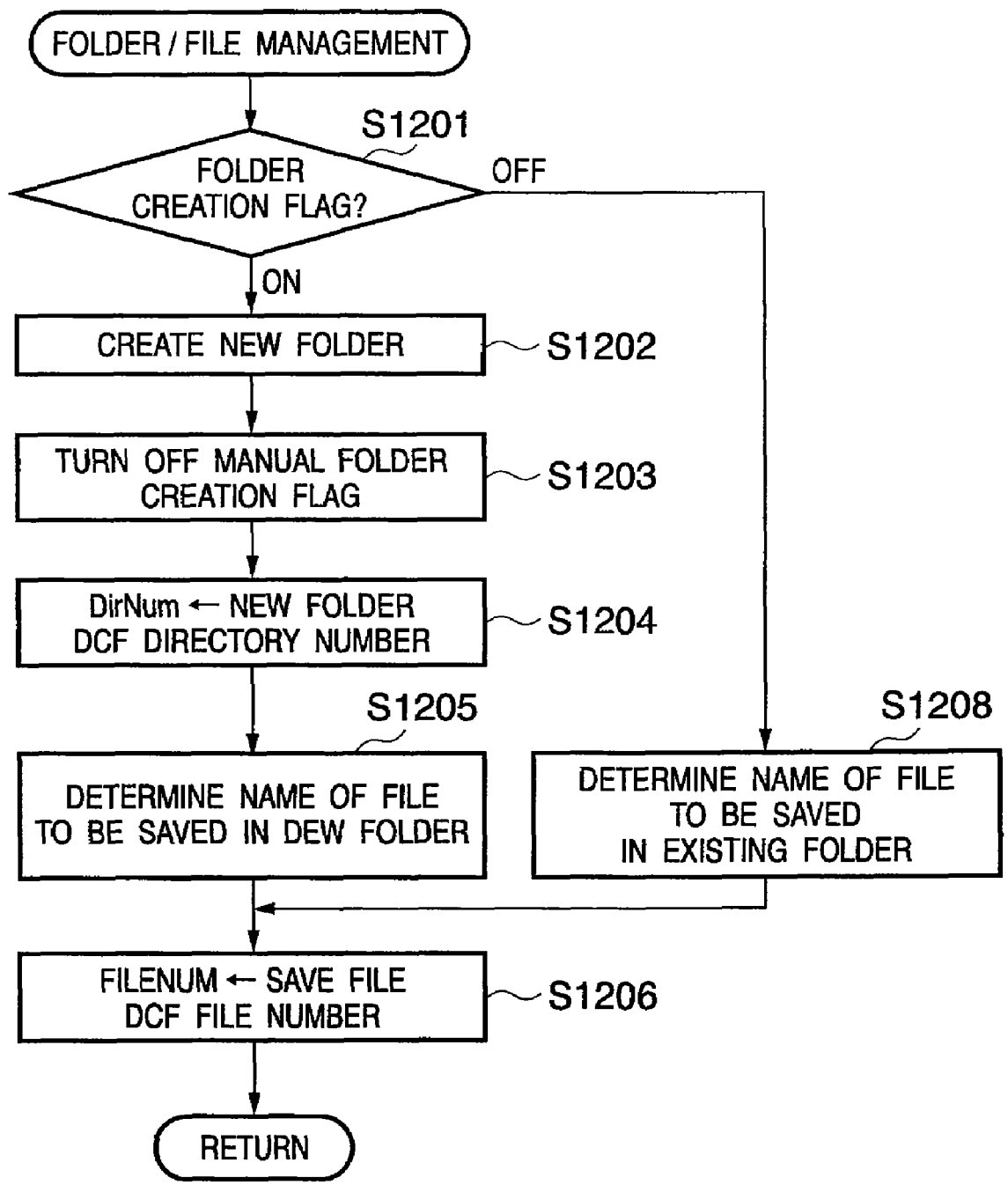
FIG. 10 is a flowchart showing the details of processing in step S125 in FIG. 3.

Folder/file management processing in step S125 in FIG. 3 and step S403 in FIG. 4 will be described next with reference to the flowchart of FIG. 10.

First of all, the system control unit 50 checks whether the folder creation flag (whose value is determined in the processing in FIG. 9) stored in the internal memory or the memory 52 is ON (S1201). If the system control unit 50 determines that the folder creation flag is OFF, the process advances to step S1208 to determine the name of a file to be stored in an existing folder having a DCF directory number equal to the value of the variable DirNum.

If the system control unit 50 determines that the folder creation flag is ON, the process advances to step S1202 to create a new folder. In step S1203, the system control unit 50 sets off (resets) the folder creation flag (see FIG. 12). The system control unit 50 performs this operation to respond to an explicit folder creation instruction from the user and to prevent the creation of a meaningless folder. In addition, as a result, even if, for example, the automatic folder creation flag is ON, the folder creation flag is OFF without any change in mode. Therefore, the display unit does not display the icon 28*g* (see FIG. 15) for the creation of a folder.

Subsequently, the system control unit 50 advances to step S1204 to store the DCF directory number of the new folder in the variable DirNum, and determines the name of a file to be saved in the new folder in step S1205. Assume that the DCF directory number of the new folder has the value obtained by adding one to the DCF directory number of the folder in which the latest image is saved. In addition, assume that of the file name saved in the new folder, the initial value of the file number is 0001. Assume also that the upper four characters of the file name form a character string set in the digital camera 100 in advance.

If a save file name is determined, the system control unit 50 advances to step S1206 to store the DCF file number of the save file in the variable FileNum. The system control unit 50 then terminates this processing.

Figure 11:
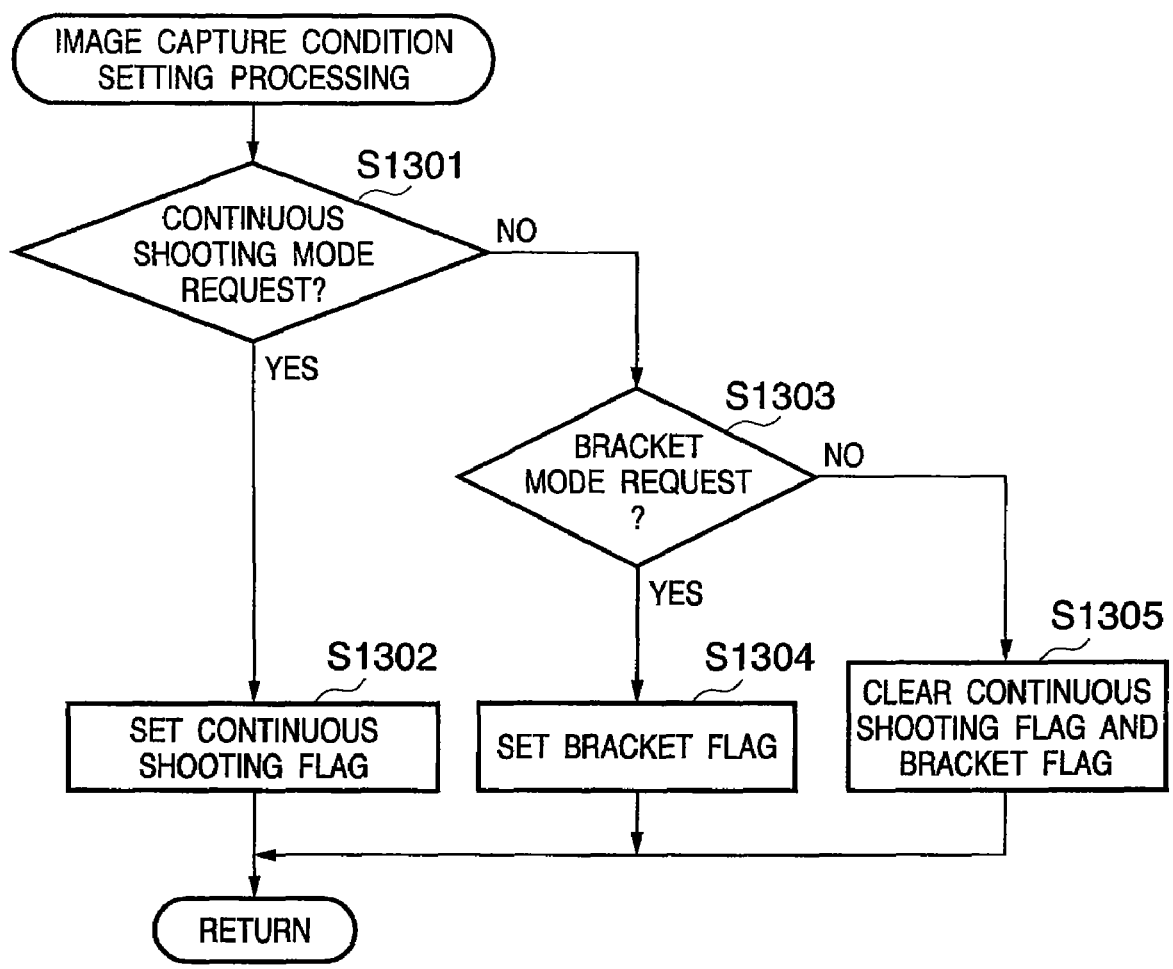
FIG. 11 is a flowchart showing the details of processing in step S108 in FIG. 2.

The image capture condition setting processing in step S108 in FIG. 2 will be described next with reference to the flowchart of FIG. 11.

First of all, the system control unit 50 checks in step S1301 whether the mode dial 60 is at the position of the continuous shooting mode. If the dial is at the position of the continuous shooting mode, the system control unit 50 advances to step S1302 to set a continuous shooting flag indicating that the current image capture mode is the continuous shooting mode in the internal memory or the memory 52, and terminates the processing.

If the mode dial 60 is not in the position of the continuous shooting mode, the system control unit 50 advances to step S1303 to check whether the dial is in the position of the bracket mode. If the dial is in the position of the bracket mode, the system control unit 50 sets a bracket flag indicating that the current image capture mode is auto bracketing in the internal memory or the memory 52 in step S1304, and terminates the processing.

If the mode dial 60 is not located at either the position of the continuous shooting mode or the position of the bracket mode, the system control unit 50 advances to step S1305 to clear both the continuous shooting flag and the bracket flag stored in the internal memory or the memory 52. The system control unit 50 then terminates the processing.

As described above, according to this embodiment, when the user makes a setting on the menu window in FIG. 13 for the creation of a new folder upon a change in an image source, i.e., the automatic folder creation flag is turned on, the system control unit 50 automatically creates a folder and saves new image data in the folder if the source of the latest image data stored in the recording medium 200 (or 210) differs from the source of image data currently stored. In addition, it is when image data to be stored is captured or image data is received that a new folder is actually created. This can therefore suppress a meaningless increase in the number of folders.

In addition, according to this embodiment, when creating a new folder, the system control unit 50 turns off the manual folder creation flag regardless of whether the manual folder creation flag is ON or OFF. That is, once creating a new folder, the system control unit 50 regards that the user has not operated the new folder creation request button 74. This can further suppress an increase in the number of folders.

According to this embodiment, displaying the icon 28g on the display unit 54 or the image display unit 28 in accordance with the folder creation flag makes it possible to give a notification of the creation of a new folder. It should be noted that when the manual folder creation flag is OFF and the automatic folder creation flag is ON, the icon 28g is automatically displayed or not displayed every time the user changes the mode. That is, this makes it possible to notify in advance the user of information for the determination of whether to create a folder.

If the user does not want to create any folder, he/she may operate the new folder creation request button 74 again or make settings on the window in FIG. 13.

In consideration of this point, if the user does not want to create a new folder, it is preferable to discriminate whether to operate the new folder creation request button 74 again or display the window in FIG. 13 and make settings again. For this purpose, this camera prepares two kinds of icons 28g (with different colors or shapes). In addition, it suffices to allow determination whether the folder creation flag is turned on because the manual folder creation flag is ON or the automatic folder creation flag is ON. In brief, it suffices to allow the folder creation flag to hold a ternary value instead of a binary value of "ON" or "OFF". More specifically, upon determining NO in step S902 in FIG. 9, the system control unit 50 may set the folder creation flag to "1". Upon determining YES in steps S906 and S909 in FIG. 9, the system control unit 50 may set the folder creation flag to "2". Otherwise, the system control unit 50 may set the folder creation flag to "0".

Other Embodiment

In the embodiment described above, the icon 28g is displayed or not displayed to announce the creation of a folder. However, it suffices to make this announcement by a message using characters or the like instead of the icon or in other forms, e.g., a sound output. Alternatively, the announcement may be made by using a combination of them. That is, the announcement form to be used is not limited to any specific one as long as it is a notification means which can notify the user that a folder is newly created at the time of image capture or reception.

If the image processing apparatus includes no display device capable of displaying icons, characters, and the like or a display unit capable of displaying icons, characters, and the like in accordance with settings and the like is OFF, another method can be used. For example, a folder creation indication may be displayed by turning on/off a simpler display device, e.g., an LED, or notification may be given using a sound. If a through-the-lens image cannot be displayed as in the case of a digital single lens reflex camera, no display may be performed by the display unit, and notification may be given using an LED or sound.

Various state indications (for example, 28a to 28f in FIG. 15) other than the folder creation indication in the digital camera 100 may be OFF depending on user settings. Even in such a case, only a folder creation indication (for example, 28g in FIG. 15) may be displayed to reliably notify the user of the creation of a folder. This allows the user to easily grasp the folder creation indication even at the time of activation or mode switching.

The above embodiment has exemplified two kinds of image data sources, i.e., "source inside camera" and "source outside camera". However, since an external apparatus can be specified by negotiation in communication (for example, a distant apparatus can be uniquely specified by a MAC address in a wireless LAN), it suffices to create a folder for each type of external apparatus. For this purpose, if an image data source is outside the camera, "latest image source" in the setting table in FIG. 12 may also store information for uniquely specifying the external apparatus.

Figure 18:
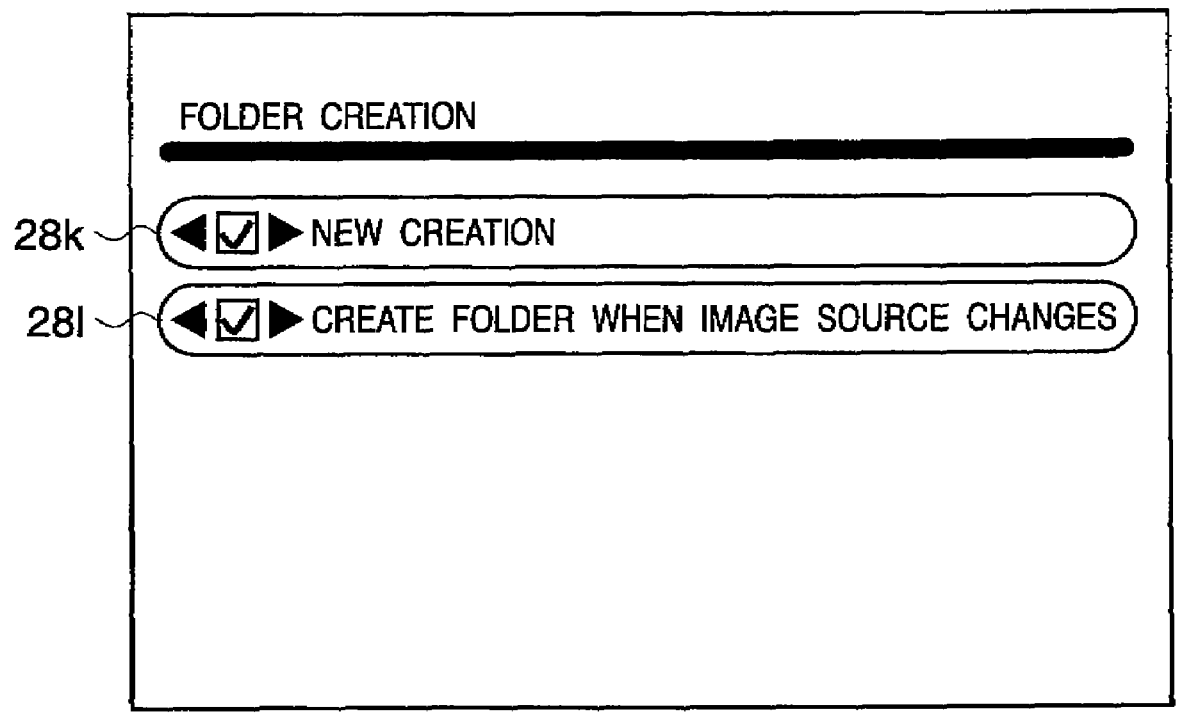
FIG. 18 is a view showing a GUI for settings for the creation of a folder in another embodiment.

In the above embodiment, the user operates the new folder creation request button 74 to turn on/off the manual folder creation flag. However, it suffices to turn on/off the manual folder creation flag on a GUI as in the case of the automatic folder creation flag. FIG. 18 shows an example of such a GUI.

Referring to FIG. 18, the menu prepares two check boxes, i.e., a check box 28k for "new creation" and a check box 28l for "create when image source changes". If the former check box is checked, the manual folder creation flag is turned on. If the latter check box is checked, the automatic folder creation flag is turned on.

Each embodiment described above has exemplified still image capture operation. However, in addition to the still image mode, a moving image mode is conceivable as the image capture mode in step S106 in FIG. 2. Obviously, in the case of moving image capture as well, the same effects as those in the case of still image capture can be obtained by performing folder creation determination processing and setting display processing before image capture and turning off the folder creation indication when a new folder is created and a captured moving image is saved in it. Although it takes a long time to capture a moving image, since the folder creation indication is displayed until a new folder is actually created and the image is saved in it, the folder creation indication is displayed during image capture.

Although the above embodiment has exemplified a wireless means as a communication means for receiving data from the outside, it suffices to use a wired means.

In addition, the above embodiment receives image data from the outside during the reproduction mode. However, it suffices to additionally prepare an external reception mode so as to allow reception of data only during the mode.

Although not specifically described in the above embodiment, a desired image can be transmitted to an external apparatus (another digital camera). In order to execute this mode, the user selects a transmission mode with the mode dial 60. In the transmission mode, the user selects desired image data in the recording medium 200 (or 210) and issues an instruction to transmit the data.

Note that the recording media 200 and 210 are not limited to memory cards such as PCMCIA cards, CompactFlash (registered trademark) memory, or the like, hard disks, and the like, but may comprise micro DATs, magneto-optical disks, optical disks such as CD-Rs, CD-RWs, or the like, phase change optical disks such as DVDs, and the like.

Furthermore, the recording media 200 and 210 may comprise hybrid media obtained by integrating memory cards, hard disks, and the like. Moreover, part of such hybrid media may be detachable.

The above embodiment has exemplified the recording media 200 and 210 which are independent of the digital camera 100 and are arbitrarily connectable. One or both the recording media may be fixed to the digital camera 100.

The digital camera 100 may be designed to allow connection of an arbitrary number (one or a plurality) of image recording media 200 or 210.

In the above embodiment, the recording media 200 and 210 are attached to the digital camera 100. However, this camera may use one or a combination of a plurality of recording media.

The present invention may be applied to a system constituted by a plurality of devices or an apparatus comprising a single device.

The object of the present invention is implemented even by supplying a storage medium (or a recording medium) storing software program codes for implementing the functions of the above embodiments to a system or apparatus, and causing the computer (or a CPU or MPU) of the system or apparatus to read out and execute the program codes stored in the storage medium. In this case, the program codes read out from the storage medium implement the functions of the above embodiments by themselves, and the storage medium storing the program codes constitutes the present invention. The functions of the above embodiments are implemented not only when the readout program codes are executed by the computer, but also when the operating system (OS) running on the computer performs part or all of actual processing on the basis of the instructions of the program codes.

The functions of the above embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

Note that the present invention may be implemented by combining the above embodiments or their technical elements, as needed.

In addition, the present invention may be designed such that the scope of claims or all or some of the components of the embodiments form one apparatus, may be an apparatus coupled to another apparatus, or may be elements constituting an apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image pickup apparatus including a communication unit which stores image data obtained by an image pickup unit in a storage medium and communicates with an external apparatus, comprising:

a mode selection unit which selects an image pickup mode using the image pickup unit or a communication mode using the communication unit to acquire images to be saved in the storage medium;

a storing unit which stores and holds information for determining whether the latest image data stored in the storage medium is image data obtained in the image pickup mode or image data obtained in the communication mode;

a first setting unit which sets whether to forcibly create a folder in the storage medium;

a second setting unit which sets whether to automatically create or not create a folder in the storage medium;

a determination unit which determines whether the current mode selected by said mode selection unit coincides with the mode in which latest data held in said storing unit is stored;

a notify unit which displays a new folder creation announcement on a display unit of the image pickup apparatus so as to notify a user that a new folder will be created when new image data to be stored is obtained, if said determination unit determines that the current mode selected by said mode selection unit does not coincide with a mode in which the last image data is stored in said storing unit; and a file management unit which, when image data to be stored in the storage medium is obtained in one of the modes, stores the image data as a file in the storage medium on the basis of settings made by said first setting unit and said second setting unit and a determination result obtained by said determination unit, wherein said file management unit (a) creates a new folder in the storage medium and stores the image data as a file in the new folder when folder creation is forcibly set by said first setting unit, (b) creates a new folder in the storage medium and stores the image data as a file in the new folder when folder creation is not forcibly set by said first setting unit, and automatic creation/non-creation of a folder is set by said second setting unit, and said determination unit determines that the modes do not coincide with each other, and (c-1) stores the image data as a file in an existing folder in the storage medium when folder creation is not forcibly set by said first setting unit, and automatic creation/non-creation of a folder is not set by said second setting unit, or (c-2) stores the image data as a file in an existing folder in the storage medium when said determination unit determines that the modes coincides with each other.

2. A control method for an image pickup apparatus including a communication unit which stores image data obtained by an image pickup unit in a storage medium and communicates with an external apparatus, comprising:
- a mode selection step of selecting an image pickup mode using the image pickup unit or a communication mode using the communication unit to acquire images to be saved in the storage medium;
- a first setting step of setting whether to forcibly create a folder in the storage medium;
- a second setting step of setting whether to automatically create or not create a folder in the storage medium;
- a determination step of determining whether the mode in which latest image data is stored coincides with the current mode selected in the mode selection step, by referring to a storing unit which stores and holds information for determining whether the latest image data stored in the storage medium is image data obtained in the image pickup mode or image data obtained in the communication mode;
- a notification step of displaying a new folder creation announcement on a display unit of the image pickup apparatus so as to notify a user that a new folder will be created when new image data to be stored is obtained, if said determination step determines that the current mode selected by said mode selection step does not coincide with a mode in which the last image data is stored in said storing unit; and
- a file management step of, when image data to be stored in the storage medium is obtained in one of the modes, storing the image data as a file in the storage medium on the basis of settings made in the first setting step and the second setting step and a determination result obtained in the determination step, wherein in the file management step, (a) a new folder is created in the storage medium and the image data is stored as a file in the new folder when folder creation is forcibly set in the first setting step, (b) a new folder is created in the storage medium and the image data is stored as a file in the new folder when folder creation is not forcibly set in the first setting step, and automatic creation/non-creation of a folder is set in the second setting step, and it is determined in the determination step that the modes do not coincide with each other, and (c-1) the image data is stored as a file in an existing folder in the storage medium when folder creation is not forcibly set in the first setting step, and automatic creation/non-creation of a folder is not set in the second setting step, or (c-2) the image data is stored as a file in an existing folder in the storage medium when it is determined in the determination step that the modes coincide with each other.

* * * * *